US009921363B2

(12) United States Patent
Inui et al.

(10) Patent No.: US 9,921,363 B2
(45) Date of Patent: Mar. 20, 2018

(54) ILLUMINATION DEVICE AND DISPLAY DEVICE

(71) Applicant: Sharp Kabushiki Kaisha, Osaka (JP)

(72) Inventors: Yoji Inui, Osaka (JP); Hiromi Enomoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 389 days.

(21) Appl. No.: 14/431,669

(22) PCT Filed: Sep. 20, 2013

(86) PCT No.: PCT/JP2013/075441
§ 371 (c)(1),
(2) Date: Mar. 26, 2015

(87) PCT Pub. No.: WO2014/050729
PCT Pub. Date: Apr. 3, 2014

(65) Prior Publication Data
US 2015/0241621 A1    Aug. 27, 2015

(30) Foreign Application Priority Data

Sep. 28, 2012 (JP) ................................. 2012-216867

(51) Int. Cl.
*G02F 1/1335* (2006.01)
*F21V 8/00* (2006.01)
(Continued)

(52) U.S. Cl.
CPC ......... *G02B 6/0051* (2013.01); *G02B 6/0073* (2013.01); *G02F 1/13394* (2013.01);
(Continued)

(58) Field of Classification Search
USPC ............................... 349/61–67; 362/600–634
See application file for complete search history.

(56) References Cited

U.S. PATENT DOCUMENTS 6,122,032 A * 9/2000 Mihara ............. G02F 1/133371
349/155
7,320,823 B2 * 1/2008 Kitahara ................. B32B 27/00
349/112
(Continued)

FOREIGN PATENT DOCUMENTS

JP      2005-183139 A    7/2005
JP      2006-84584 A     3/2006
(Continued)

OTHER PUBLICATIONS

Google Patents english machine translation of WO2012073830A1.*

*Primary Examiner* — Edward Glick
*Assistant Examiner* — David Chung
(74) *Attorney, Agent, or Firm* — Chen Yoshimura LLP

(57) ABSTRACT

This backlight device (illumination device) is provided with (LEDs) light source; a light guide plate having a light-receiving face that opposes the LEDs and where light from the LEDs is incident, and a light-exiting surface where the incident light is emitted; and an optical sheet (optical member) arranged in opposition to the light-exiting surface of the light guide plate and imparting an optical effect to the light emitted from the light-exiting surface. Here, the optical sheet has, in at least one portion thereof, a chromaticity correction region for which x and y chromaticity coordinate values in a CIE 1931 color space both decrease with distance from the LEDs.

13 Claims, 27 Drawing Sheets

(51) Int. Cl.
*G02F 1/1333* (2006.01)
*G02F 1/1339* (2006.01)

(52) U.S. Cl.
CPC .. *G02F 1/133371* (2013.01); *G02F 1/133615* (2013.01); *G02B 6/0053* (2013.01); *G02B 6/0055* (2013.01); *G02B 6/0061* (2013.01); *G02B 6/0068* (2013.01); *G02B 6/0078* (2013.01); *G02F 1/133609* (2013.01); *G02F 2001/13396* (2013.01)

(56) References Cited

U.S. PATENT DOCUMENTS

| | | | |
|---|---|---|---|
| 8,662,727 B2 * | 3/2014 | Kanade | G02B 6/0028 349/65 |
| 2007/0153160 A1 * | 7/2007 | Lee | G02F 1/133512 349/95 |
| 2009/0092366 A1 * | 4/2009 | Iwasaki | G02B 6/0038 385/129 |
| 2009/0225256 A1 * | 9/2009 | Kim | G02F 1/133603 349/64 |

FOREIGN PATENT DOCUMENTS

| | | |
|---|---|---|
| JP | 2011-252963 A | 12/2011 |
| WO | 2012/073830 A1 | 6/2012 |

* cited by examiner

FIG. 13
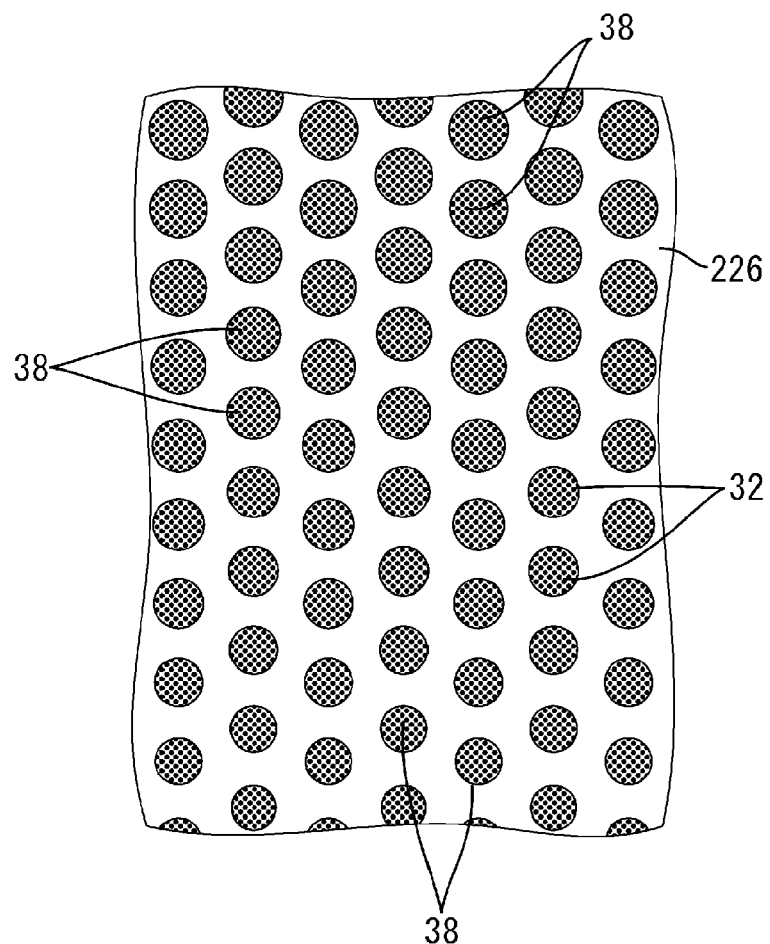
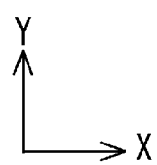

ILLUMINATION DEVICE AND DISPLAY DEVICE

TECHNICAL FIELD

The present invention relates to an illumination device and a display device.

BACKGROUND ART

In recent years, liquid crystal display devices have been used as the display devices in electronic devices such as mobile information terminals (cell phones, smartphones, tablet-type computers, and the like). The liquid crystal display device uses a liquid crystal panel as a display panel for displaying images, and a backlight device that supplies illuminating light to the liquid crystal display panel. The backlight device used in the liquid crystal display devices can be broadly classified as either edge-lit or backlit depending on the mechanism employed. In order to realize even thinner liquid crystal display devices, it is preferable that a backlit device be used. One well-known example of such a device is described in Patent Document 1 below. Described in Patent Document 1 is a device that includes a color correction unit having a function for transmitting all visible light except for that of a specific wavelength to correct the color of light being emitted from the light-exiting surface of the light guide plate.

RELATED ART DOCUMENT

Patent Document

Patent Document 1: Japanese Patent Application Laid-Open Publication No. 2006-84584

Problems to be Solved by the Invention

The object of the color correction unit described in Patent Document 1 is to correct color errors generated when LEDs of a type whereby white light is obtained by additive coloring of a light source are used. Hence, the color of the entire body of light emitted from the light-exiting surface of the light guide plate is corrected.

Besides the problems caused by the above-described phenomenon, color variations can occur for other reasons, such as absorption of light of a particular wavelength by the light guide plate itself in the process of propagating the light emitted from the light source within the light guide plate. It has been difficult to countermeasures such problems.

SUMMARY OF THE INVENTION

The present invention was completed on the basis of the above-described circumstances with the aim of suppressing color variation in the emitted light.

Means for Solving the Problems

An illumination device of the present invention includes: a light source; a light guide plate having a light-receiving side face opposing the light source and receiving light therefrom, and a light-exiting surface from where the received light exits; and an optical member disposed so as to face the light-exiting surface of the light guide plate and exert an optical effect on light emitted therefrom, the optical member having, on at least one area thereof, a chromaticity correction region that is configured to transmit light having chromaticity coordinate values x and y in a CIE 1931 color space that both progressively decrease further away from the light source when receiving a reference white light, the chromaticity correction region thereby compensating for a chromaticity distribution that is generated by the light guide plate processing the light from the light source so as to emit light that has substantially uniform chromaticity across the chromaticity correction region when processing the light originating from the light source.

With this arrangement, light incident on the light-receiving face of the light guide plate from the light source is emitted from the light-exiting surface after propagating within the light guide plate. Shorter wavelength light contained in the light propagating within the light guide plate tends to be more easily absorbed by the light guide plate than longer wavelength light. Hence, there is a tendency for an amount of shorter wavelength light in the light incident on the light-receiving face to decrease as a distance of propagation within the light guide plate lengthens, and, consequently, color variation occurs in the light emitted from the light-exiting surface.

To solve this problem, an optical member arranged in a form opposed to the light-exiting surface of the light guide plate has, in at least one portion thereof, a chromaticity correction region for which x and y chromaticity coordinate values in a CIE 1931 color space both decrease with distance from the light source. Hence, while color variation of the type described above still occurs in the light emitted from the light-exiting surface of the light guide plate, when this light passes through the optical member, transmission of longer wavelength light is suppressed, the level of suppression increasing with distance from the light source. Thus, the chromaticity of the transmitted light from the optical member is corrected and homogenized, and, consequently, color variation in the light transmitted through the optical member and emitted from the illumination device is less likely to occur.

It is preferable that one aspect of the illumination device of the present invention have the following configuration.

(1) When chromaticity coordinate values of the CIE 1931 color space of the chromaticity correction region are denoted (x1, y1), and the chromaticity coordinate values in the CIE 1931 color space used as a white reference chromaticity are denoted (x0, y0), the optical member may be configured so that a minimum value of x1 is smaller than x0, and a minimum of value of y1 is smaller than y0 in the chromaticity correction region. With such a configuration, the minimum values of x1 and y1 in the chromaticity correction region are smaller than x0 and y0 of the white reference chromaticity, respectively. Consequently, the transmitted light from the chromaticity correction region is corrected further towards blue as one moves further from the light source. For example, in the process of light being propagated within the light guide plate, in the particular case that light in the blue, long wavelength region is absorbed by the light guide plate, the light emitted from the light-exiting surface would normally become more yellow as one moves further away from the light source. However, in the above-described arrangement, the transmitted light from the chromaticity correction region of the optical member is corrected further towards blue, which is the complementary color for yellow, as one moves further away from the light source. Hence it is possible to promote favorable homogenization in the chromaticity of the transmitted light from the optical member.

(2) The optical member may be configured such that a maximum value of x and a maximum value of y in the chromaticity correction region are respectively approximately equal to chromaticity coordinate values x0 and y0 of the reference white light. With such a configuration, the maximum values of x and y in the chromaticity correction region are smaller than x0 and y0 of the white reference chromaticity, respectively. Consequently, the transmitted light from the chromaticity correction region is corrected further towards blue as one moves further from the light source. For example, in the case that the light guide plate is increased in size and an optical path of the light propagating within the light guide plate is long, light emitted from the light-exiting surface would normally become strongly yellow as one moves further away from the light source. However, in the above-described arrangement, all the transmitted light from the chromaticity correction region of the optical member is corrected further towards blue, which is the complementary color for yellow, as one moves further away from the light source. Hence, it is possible to promote favorable homogenization of chromaticity for the transmitted light of the optical member, even in the case of large-sized illumination devices.

(3) The optical member may be configured such that the x and y values of the light transmitted from the chromaticity correction region in response to the reference white light both linearly decrease further away from the light source. With such a configuration, when the light emitted from the light-exiting surface of the light guide plate is passing through the optical member, the transmittance of the longer wavelength light by the chromaticity correction region gradually decreases in a continuous manner as one moves further from the light source. Thus, the chromaticity of the transmitted light can be more appropriately corrected, and color variation in light emitted from the illumination device after passing through the optical member is less likely to occur.

(4) The light guide plate may have a rectangular shape in a plan view, one short-side end face thereof being the light-receiving side face and another short-side end face on a side opposite to the light-receiving face and a pair of long-side end faces being non-light source facing end faces that do not face the light source, and the optical member may have a rectangular shape in a plan view corresponding to the light guide plate, and at least an end of the optical member on a side opposite to the light source is the chromaticity correction region. With this configuration in which one short-side end face of the light guide plate having a rectangular form when seen in plan opposes the light source, light that is incident on the light-receiving face of the light guide plate tends to have a long optical path to reach the light source non-facing end face on the opposite side to the light-receiving face. Hence, there is a tendency for an amount of shorter wavelength light absorption by the light guide plate to increase as one approaches the light source non-facing end face on the opposite side to the light-receiving face. Thus, when the light emitted from the light-exiting surface of the light guide plate is passing through the optical member in the manner described above, the transmittance of the longer wavelength light by the chromaticity correction region decreases as one moves further from the light source. Hence, the chromaticity of the transmitted light can be appropriately corrected, and color variation in light emitted from the illumination device after passing through the optical member is less likely to occur.

(5) The chromaticity correction region may include all regions of the optical member. Even, for example, in the case that a specific color is imparted at a position extremely close to the light source to the light emitted from the light-exiting surface of the light guide plate, since all regions of the optical member form the chromaticity correction region as described above, the chromaticity of transmitted light from the optical member can be appropriately corrected.

(6) The optical member may include a light diffusing member having at least a transparent base material and light diffusing particles provided on the transparent base material that diffuse light, and the chromaticity correction region may be formed in at least a portion of the light diffusing member. With this configuration, the light emitted from the light-exiting surface of the light guide plate is diffused by the light diffusing particles provided on the transparent base material when passing through the light diffusing member included in the optical member, making it less likely that brightness variation will occur. As a result of the chromaticity correction region included in the light diffusing member, the chromaticity of the transmitted light from the light diffusing member is corrected and homogenized, and, consequently, color variation in the light emitted from the illumination device is less likely to occur.

(7) The light diffusing particles may at least include blue-colored light diffusing particles that exhibit a blue color, and the light diffusing member may be configured such that a concentration of light diffusing particles in the chromaticity correction region becomes progressively greater further away from the light source. With this configuration, the light passing through the light diffusing member takes on a blue tinge when diffused by the blue-colored light diffusing particles that exhibit blue. Since the contained quantity of the blue-colored light diffusing particles in the chromaticity correction region of the light diffusing member increases as one moves in the direction away from the light source, it becomes easier to impart the blue tinge to the transmitted light from the light diffusing member as one moves further away from the light source. As a result, the chromaticity of the transmitted light from the light diffusing member is corrected and homogenized, and, consequently, color variation in the light emitted from the illumination device is less likely to occur.

(8) The optical member may include a transparent base material, and a light focusing member disposed on one surface of the transparent base material and having at least a plurality of prisms extending in a straight line on the one surface of the transparent base material, and the chromaticity correction region may be formed in at least a portion of the light focusing member. With this configuration, the light emitted from the light-exiting surface of the light guide plate is focused by the multiple prisms provided on the transparent base material when passing through the light focusing member included in the optical member. As a result of the chromaticity correction region included in the light focusing member, the chromaticity of the transmitted light from the light focusing member is corrected and homogenized, and, consequently, color variation in the light emitted from the illumination device is less likely to occur.

(9) Provided on the optical member may be a blue-colored film having a pigment or dye exhibiting a blue color attached thereto, and a concentration of the pigment or dye in the chromaticity correction region is made progressively greater further away from the light source. With this configuration, the light passing through the optical member takes on a blue tinge as a result of the pigment or dye that exhibits blue and is contained in the blue colored film. Since the contained quantity of the dye or pigment in the chromaticity correction region of the optical member increases as one moves in the direction away from the light source, the blue tinge is more easily imparted to the transmitted light from the light diffusing member as one moves further away from the light source. As a result, the chromaticity of the transmitted light from the optical member is corrected and homogenized, and, consequently, color variation in the light emitted from the illumination device is less likely to occur.

(10) The illumination device may further include a reflecting member in contact with a surface of the light guide plate on a side opposite to the light-exiting surface of the light guide plate, the reflecting member causing light in the light guide plate to be reflected towards the light-exiting surface of the light guide plate, and the reflecting member may have, on at least one area thereof, a chromaticity correction region configured to generate reflected light having chromaticity coordinate values x and y in the CIE 1931 color space that both progressively decrease further away from the light source when reflecting the reference white light. With this arrangement, when light is incident on the light-receiving face of light guide plate from the light source, the light is, in the process of propagating within the light guide plate, reflected towards the light-exiting surface by the reflecting member arranged to be in contact with the plate surface on the opposite side to the light-exiting surface, and is therefore emitted from the light-exiting surface. For the light propagating within the light guide plate, the propagation of longer wavelength light is suppressed to a greater extent by the second chromaticity correction region included in at least a part of the reflecting member as one moves further away from the light source. Thus, the chromaticity of the emitted light from the light guide plate is corrected and, consequently, in combination with the chromaticity correction region included in the optical member, this arrangement makes it less likely that color variation will occur in the light emitted from the illumination device.

(11) The light source may be a light-emitting diode device, and the light-emitting diode device may include at least a light-emitting diode element that emits an approximately single-color light of a blue color, and a phosphor that emits light when excited by light from the light-emitting diode element. With this configuration, the light emitted from the LED that is the light source includes a large amount of light in the blue wavelength region. Although there is a tendency for light in the blue long wavelength region to be easily absorbed by the light guide plate during the process of propagation within the light guide plate, when the light emitted from the light-exiting surface of the light guide plate is passing through the optical member in the manner described above, the transmittance of the longer wavelength light by the chromaticity correction region decreases as one moves further from the light source. Hence, the chromaticity of the transmitted light can be appropriately corrected, and light emitted from the illumination device after passing through the optical member is less likely to exhibit color variation.

Next, to solve the above-described problem, a display device of the present invention may include: any one of the illumination devices described above; and a display panel that performs display using light from the illumination device.

According to this display device, the occurrence of color variation in the illumination device that supplies light to the display panel is suppressed. Hence, display of an excellent display quality can be realized.

The following configuration is preferable as one aspect of the display device of the present invention.

(1) One example of the display panel is a liquid crystal panel. The display device may be a liquid crystal display device, and can be applied in various applications, such as in the display of mobile information terminals and the like.

(2) The liquid crystal panel may be configured such that a gap defined between a pair of the substrates becomes progressively wider further away from the light source. The chromaticity of the transmitted light from the liquid crystal panel may fluctuate according to the gap (cell gap) between the pair of substrates. For example, as the gap widens, there is a tendency for the chromaticity of the transmitted light take on a yellow tinge. Hence, as described above, in a configuration in which the gap between the pair of substrates widens as one moves away from the light source, though it might be expected that the transmitted light from the liquid crystal panel will be subject to color variation due to yellowing as one moves away from the light source, by providing the chromaticity correction region in the optical member that forms part of the illumination device, it is possible to appropriately mitigate the color variation occurring in the transmitted light from the liquid crystal panel.

Effects of the Invention

According to the present invention it is possible to suppress the occurrence of color variation in emitted light.

BRIEF DESCRIPTION OF THE DRAWINGS

FIG. 13 is an enlarged plan view of the reflective sheet.

DETAILED DESCRIPTION OF EMBODIMENTS

Embodiment 1

Embodiment 1 of the present invention will be explained below with reference to FIGS. 1 to 10. In the present embodiment, a liquid crystal display device 10 including a cover panel 12 is described as an example. Note that a portion of the drawings shows the X axis, Y axis and Z axis, and the axial directions in a given drawing are those depicted in that drawing. Moreover, the upper-lower direction is based on FIG. 5, with an upper side of the figure being the front side, and a lower side of the figure being the rear side.

Figure 1:
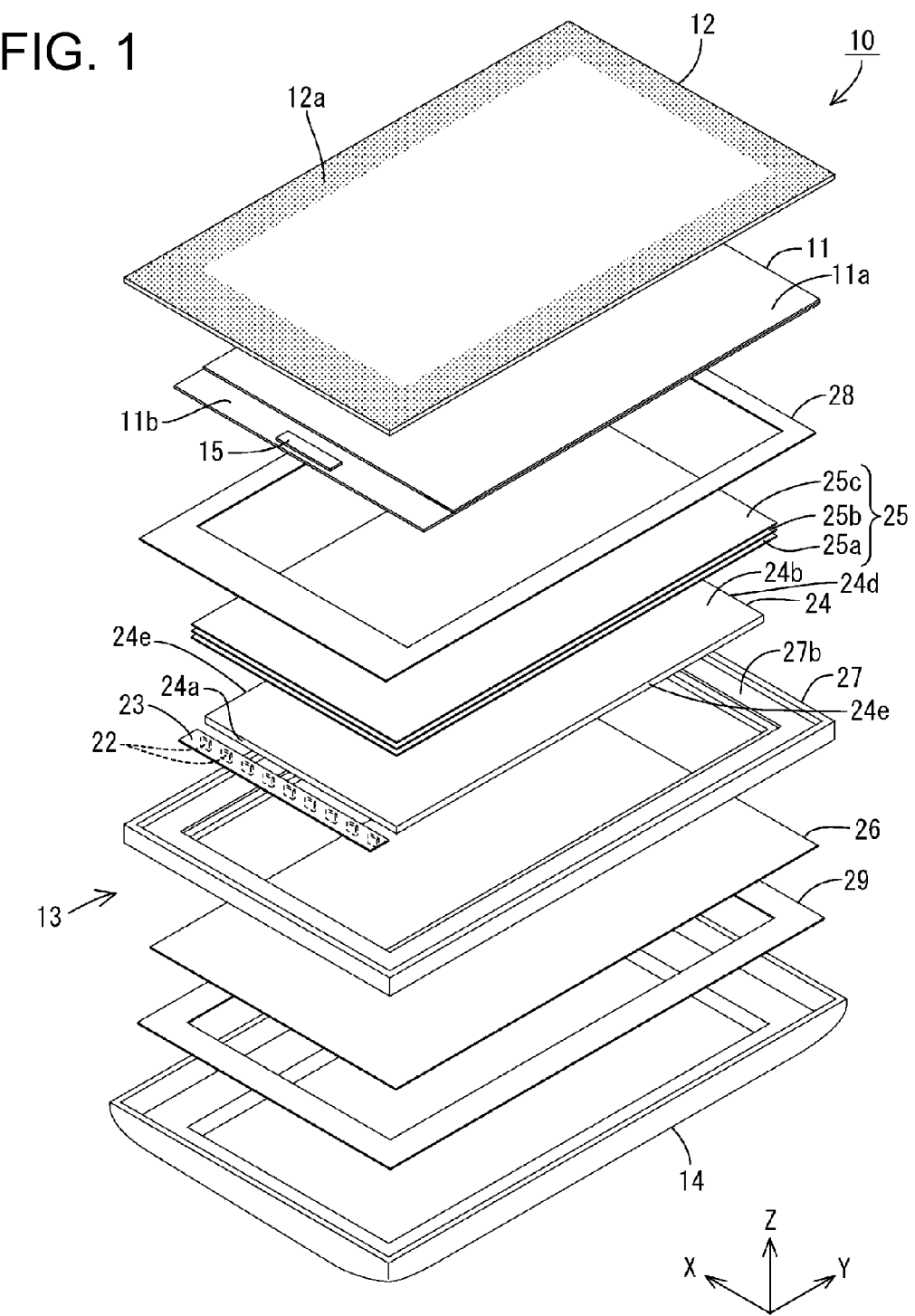
FIG. 1 is an exploded perspective view showing a liquid crystal display device according to Embodiment 1 of the present invention.

As illustrated in FIG. 1, the liquid crystal display device 10 as a whole has a vertically long rectangular form, and includes a liquid crystal panel (display panel) 11 for which a plate surface on the front side is a display surface where images are displayed and a plate surface on a rear side is an opposite surface, a cover panel 12 that is disposed in opposition to the display surface of the liquid crystal panel, and a backlight device (illumination device) 13 that is disposed in opposition to the opposite surface of the liquid crystal panel 11 (on the opposite side to the side of the cover panel 12) and forms an external light source that supplies light to the liquid crystal panel 11. Further, the liquid crystal display device 10 includes a casing (housing member, exterior member) 14 that houses the cover panel 12, the liquid crystal panel 11 and the backlight device 13. Among the components of the liquid crystal display device 10, it is the cover panel 12 and the casing 14 that configure the external appearance of the liquid crystal display device 10. The liquid crystal display device 10 of the present embodiment can be used in various electronic devices, including mobile information terminals (cell phone, smartphone, tablet computer, or the like), vehicle-mounted information terminals (detachable car navigation systems, and portable games machines). The screen size for the liquid crystal panel 11 and the cover panel 12 that form the liquid crystal display device 10 range from a few inches to 10 inches, 7 inches for instance, and can generally be classified as being either small or medium.

Figure 2:
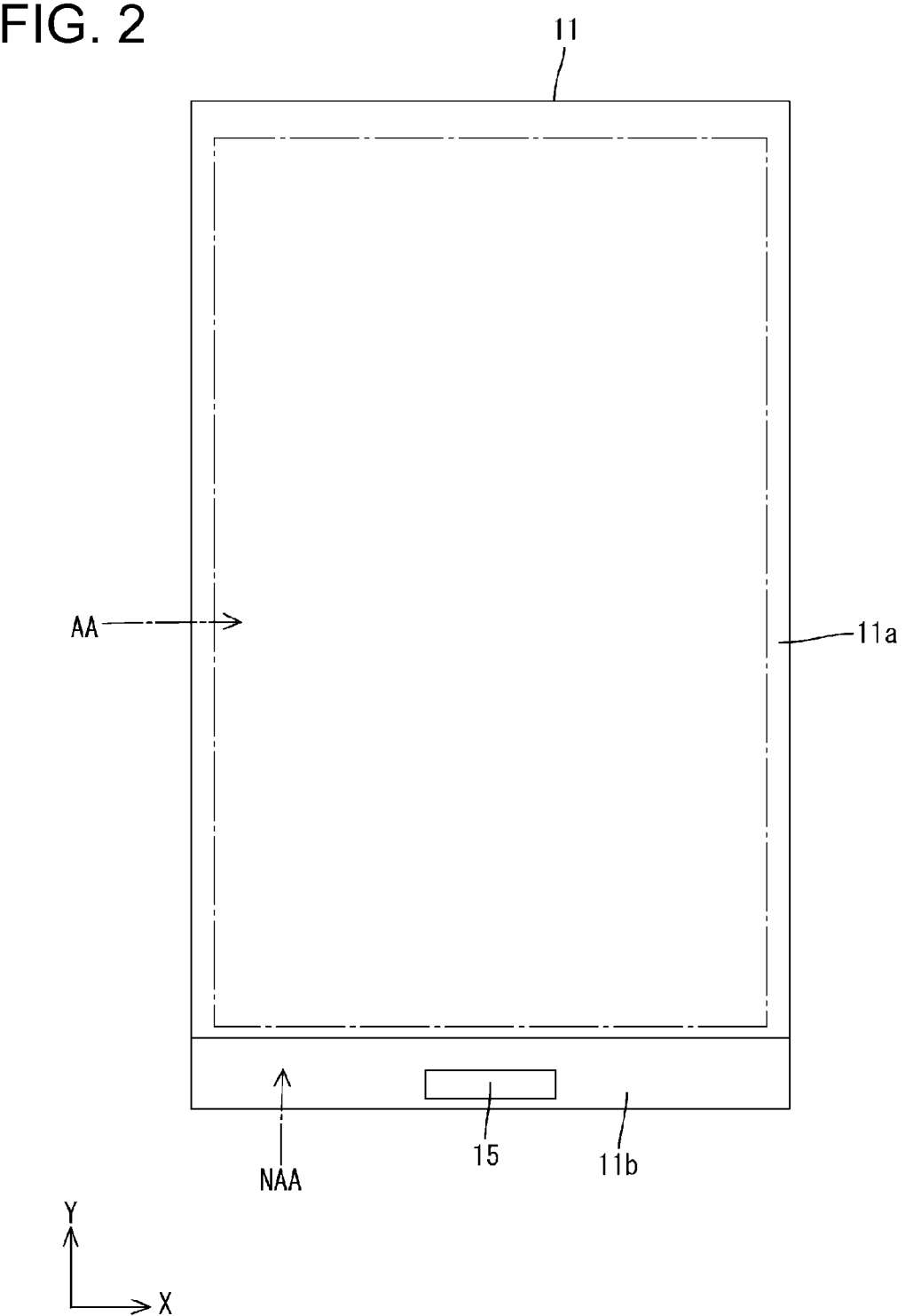
FIG. 2 is a plan view of a liquid crystal panel.

The liquid crystal panel 11 will now be explained. As illustrated in FIG. 2, the liquid crystal panel 11 has, as a whole, a vertically long rectangular form. Attached thereto is a display area (active area) AA for displaying the image at position shifted slightly towards one end in the long-side direction (top in FIG. 2) and a driver (panel driving unit) 15 for driving the liquid crystal panel 11 at a position toward the other end in the long-side direction (bottom in FIG. 2). Within the liquid crystal panel 11, a region having a substantial frame-like (box-like) form surrounding the display area AA is a non-display area (non-active area) NAA that does not display the image. In the non-display area NAA, the driver 15 is directly mounted in chip on glass (GOG) form. In the non-display area NAA of the liquid crystal panel 11, a flexible substrate (not shown in the drawings) is connected to the driver 15 for supplying various input signals. Further, a long-side direction of the liquid crystal panel 11 matches the Y-axis direction and the short-side direction matches the X-axis direction. Note also that frame-like dot-dash line in FIG. 2 represents the outer edge of the display area AA, regions outside the dot-dash line being the non-display area NAA.

Figure 5:
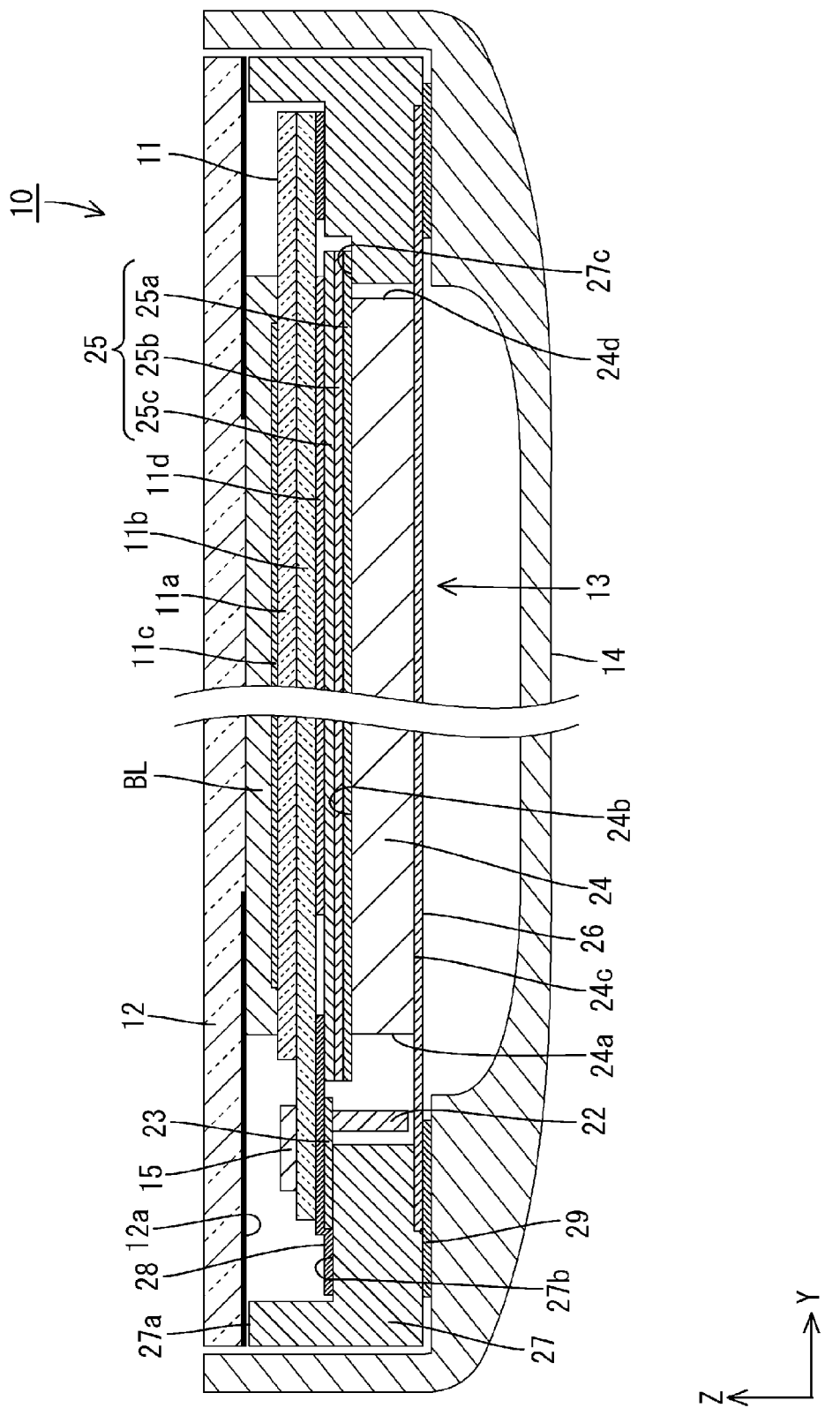
FIG. 5 is a cross-sectional view of the liquid crystal display device taken along a long-side direction (Y-axis direction).

As illustrated in FIG. 5, the liquid crystal panel 11 includes a pair of transparent (having transparency properties) glass substrates 11a and 11b, and, interposed between the two substrates 11a and 11b, a liquid crystal layer (not shown in the drawings) including liquid crystal molecules having optical characteristics that vary according to the applied electric field. The two substrates 11a and 11b are adhered together using a sealing agent not shown in the drawings in a state in which a gap of width corresponding to the liquid crystal layer is maintained between the substrates 11a and 11b. Of the substrates 11a and 11b, the CF substrate 11a disposed on the front side has, as illustrated in FIG. 2, approximately the same short-side dimension as the array substrate 11b disposed on the rear side. However, the long-side dimension of the CF substrate 11a is smaller than that of the array substrate 11b. The CF substrate 11a is adhered to the array substrate 11b with end portions at one end of the long-side direction (top side in FIG. 2) aligned. Hence, at the other end portion of the long-side direction (bottom side in FIG. 2) of the array substrate 11b, the array substrate 11b is not overlapped by the CF substrate 11a over a prescribed range, and the front and rear plate surfaces are in a state of exposure to the outside. This area is thus secured as a mounting area for the driver 15. Moreover, polarizing plates 11c and 11d are adhered to the outer surface sides of the substrates 11a and 11b respectively. The size (area) of the polarizing plate 11c and 11d is slightly larger than the display area AA.

Figure 3:
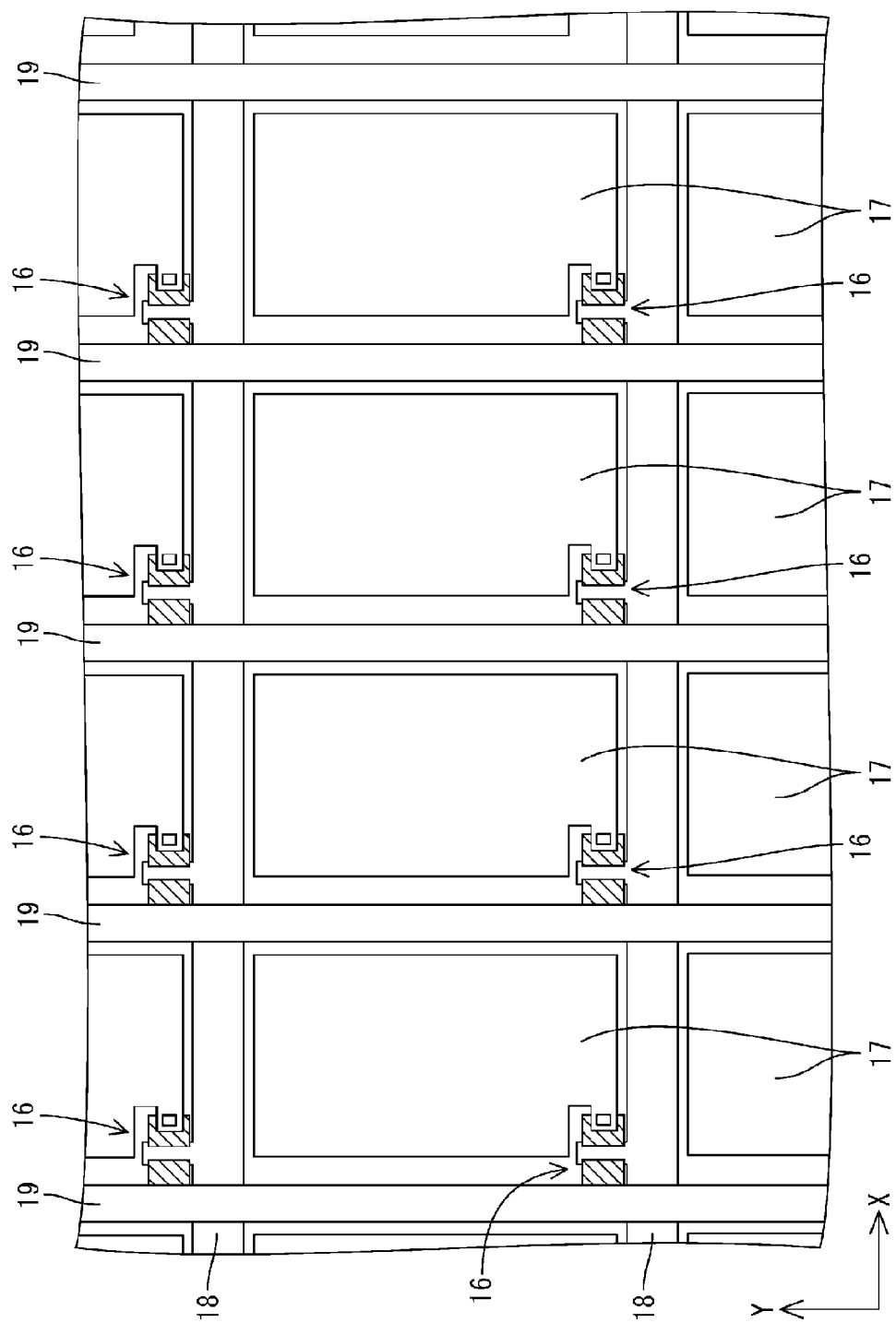
FIG. 3 is a plan view of display units of an array substrate that configures the liquid crystal panel.

Of the pair of substrates 11a and 11b that configure the liquid crystal panel 11, the front side (front) is the CF substrate 11a, and the rear side (back) is the array substrate 11b. As illustrated in FIG. 3, the inner surface side of the array substrate 11b (liquid crystal layer side, side of surface that opposes the CF substrate 11a) has provided thereon multiple thin film transistors (TFTs) 16 that are switching elements and pixel electrodes 17 arranged in a matrix. Around the TFTs 16 and the pixel electrodes 17, multiple gate wiring 18 and source wiring 19 is disposed in a grid pattern. In other words, the TFTs 16 and pixel electrodes 17 area arranged in rows and columns at intersections between the multiple gate wiring 18 and source wiring 19 that form the grid pattern. The gate wiring 18 and the source wiring 19 are formed from an electrically conductive and light-shielding metal film (a thin film made of a metal material such as copper, aluminum, titanium or the like), and are provided in mutually different layers. Short circuits at the intersections are prevented by interposing an insulating film, which is not shown in the drawings, between the two types of wiring. The gate wiring 18 and the source wiring 19 are connected to the gate electrodes and source electrodes of the TFTs 16 respectively, and the pixel electrodes 17 are connected to the drain electrodes of the TFTs 16. The gate electrodes included in the TFTs 16 are formed from the same metal film as the gate wiring 18 and are arranged in the same layer. On the other hand, the source electrodes and the drain electrodes included in the TFTs 16 are formed from the same metal film as the source wiring 19 and are arranged in the same layer. The gate wiring 18 and the source wiring 19 are connected at respective ends to the driver 15 and receive signals supplied from the driver 15. Further, the pixel electrodes 17 are formed from a transparent electrode film that is electrically conductive and transparent (such as an indium tin oxide (ITO) film).

Figure 4:
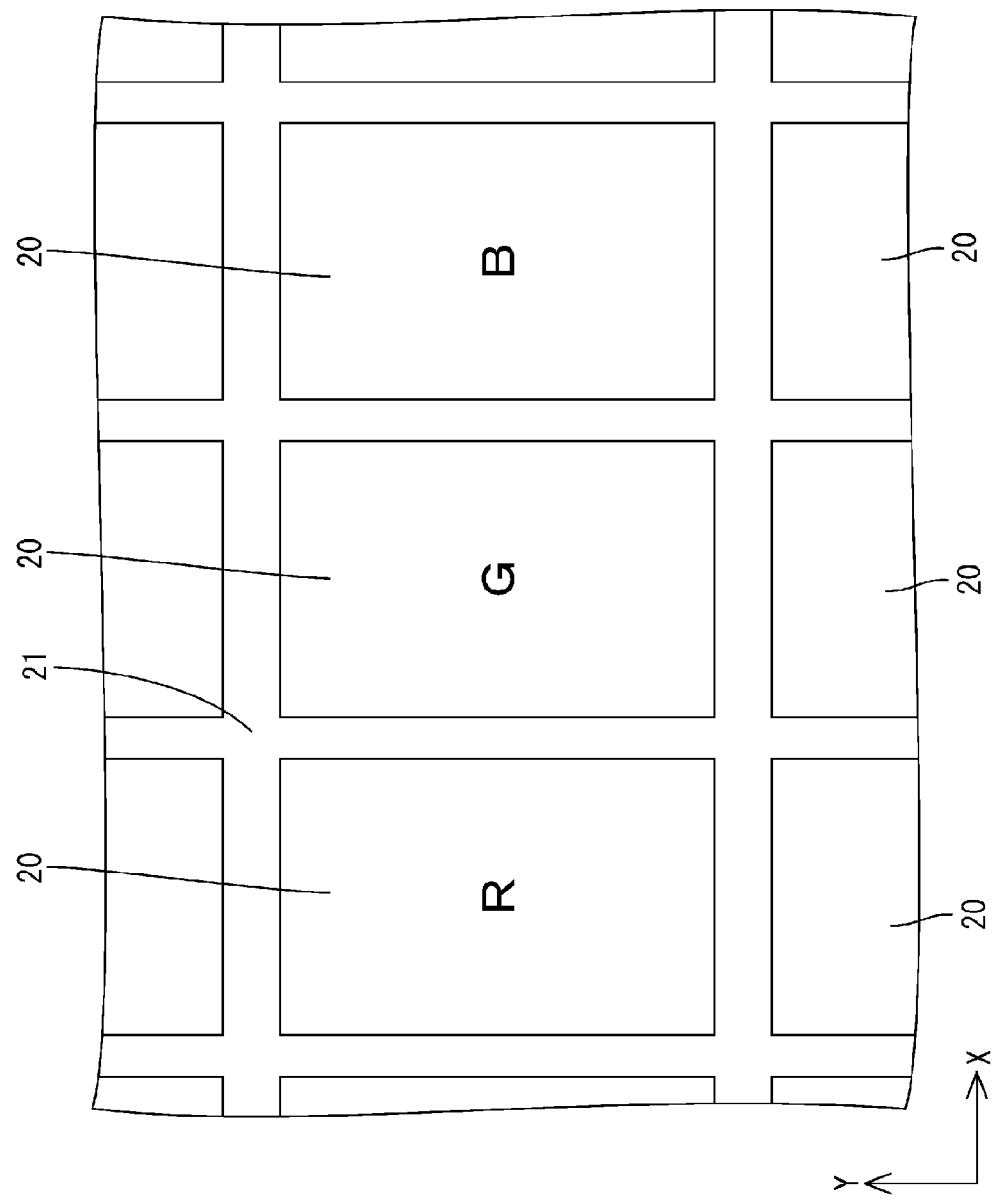
FIG. 4 is a plan view of display units of a CF substrate that configures the liquid crystal panel.

Further, as illustrated in FIG. 4, the inner surface side of the CF substrate 11a (liquid crystal layer side, side of surface that opposes the array substrate 11b) has provided thereon multiple color filters positioned so as to overlap the pixel electrodes 17 on the side of the array substrate 11b when the arrangement is seen in play view. The color filters have color portions 20 that provide red (R), green (G) and blue (B) colors and are arranged to alternate along the X-axis direction. The color portions 20 have a rectangular form when seen in plan with the short-side direction and long-side direction matching the short-side direction and long-side direction of the substrates 11a and 11b. Further, multiple color portions 20 are arranged in a matrix aligned with the X-axis direction and the Y-axis direction on the CF substrate 11a. Between the color portions 20 that configure the color filter is a black matrix (light shielding area between color portions) 21 formed in a lattice to prevent the mixing of colors. The black matrix 21 is arranged to overlap the gate wiring 18 and the source wiring 19 on the side of the array substrate 11b when seen in plan view. In the liquid crystal panel 11, the three R, G and B color portions 20 and the corresponding three pixel electrodes 17 configure a single pixel that forms a display unit. A multitude of such pixels is arranged in a matrix along the plate surfaces (X-axis direction and Y-axis direction) of the two substrates 11a and 11b. Provided on the front surface of the color portions 20 and the black matrix 21 opposite electrodes (common electrodes) not shown in the drawings that oppose the pixel electrodes 17 on the side of the array substrate 11b. Further, alignment films (not shown) for orientating the liquid crystal molecules included in the liquid crystal layer are provided on the inner surface side of the two substrates 11a and 11b.

As illustrated in FIGS. 1 and 5, the cover panel 12 is arranged in a form that covers the entire region of the liquid crystal panel 11 from the front side, thereby enhancing protection of the liquid crystal panel 11. The liquid crystal panel 11 is adhered via an adhesive BL to a plate surface of the rear side of the cover panel 12 at a central portion thereof (more specifically, at a portion overlapping, when seen in plan view, the entire display area AA of the liquid crystal panel 11 and an inner peripheral portion of the non-display area NAA adjacent to the display area AA). The adhesive agent BL is coated in a liquid state on one or both of the liquid crystal panel 11 and the cover panel 12 and, after the two panels 11 and 12 are adhered together, is cured. As a result the two panels 11 and 12 are attached together in an adhered state. Thus, since the formation of an air layer between the cover panel 12 and the liquid crystal panel 11 can be avoided, improvement in display quality promoted. Note also that it is preferable that the UV-curable resin material, which is cured by irradiation with ultra-violet light, be used as the adhesive BL. The cover panel 12 is, for example, formed from a plate-like toughened glass having a high transparency. For the toughened glass used in the cover panel 12, it is preferable that chemically toughened glass including a chemical toughening layer at a front surface is used. This can be achieved by, for example, performing a chemical toughening process on the front surface of a plate-like glass base material. The chemical toughening process refers to a process of toughening a plate-like glass base material by, for example, replacing, through ion exchange, the alkali metal ions included in the glass material with alkali metal ions having a large ion radius. As a result of this process, the chemically toughened layer that is formed has a compressively stressed layer (ion exchange layer) where residual compressive stress is present. As a result, the cover panel 12 has a high mechanical strength and impact resistance, making it possible to more reliably prevent breaking or scratching of the liquid crystal panel 11 on the rear side.

Like the liquid crystal panel 11, the cover panel 12 has a vertically long rectangular form when seen in plan view. The size of the cover panel 12 when seen in plan view is a certain amount larger than the substrates 11a and 11b that form the liquid crystal panel 11, and is substantially the same size as an external form of a later-described panel support frame 27. Hence, the peripheral section of the cover panel 12 projects in an overhanging manner from the peripheral edge of the liquid crystal panel 11. The cover panel 12 has formed thereon a light-shielding portion 12a that surrounds the display area AA of the liquid crystal panel 11 and is arranged to overlap the non-display area NAA when seen in plan view so as to shield the periphery of the display area AA. The light-shielding portion 12a is formed, for example, from a light-shielding material such a black coating material. The light-shielding material is provided in an integrated manner on the plate surface by printing on the rear side of the cover panel 12, which is to say the plate surface on the side of the liquid crystal panel 11. Note that when providing the light-shielding portion 12a, a printing means such as screen printing or ink-jet printing can be used. On the cover panel 12, the light-shielding portion 12a is formed not only at the portion that overlaps the entire area of the non-display area NAA of the liquid crystal panel 11, but also at a peripheral section that projects outwards of the peripheral edge of the liquid crystal panel 11, thereby forming a vertically long, substantially frame-like form (substantially box-like form). As a result, the light from the backlight device 13 can be blocked in the area surrounding the display area AA at a stage before incidence on the plate surface of the rear side of the cover panel 12. In other words, of the cover panel 12, the light-shielding portion 12a is formed over substantially the entire area that, when the arrangement is seen in plan view, does not overlap the display area AA of the liquid crystal panel 11. Note that in FIG. 1, the light-shielding portion 12a is indicated by shading. The white rectangular region within the shading represents the display area AA where light can pass through.

As illustrated in FIGS. 1 and 5, the backlight device 13 as a whole has a vertically long, substantially block-like form similar to that of the liquid crystal panel 11. The backlight device 13 includes light emitting diodes (LEDs) 22 that form the light source, an LED substrate (light source mounting substrate) 23 on which the LEDs 22 are mounted, a light guide plate 24 that guides light from the LEDs 22, an optical sheet (optical member) 25 arranged as a layer on the light guide plate 24, a reflective sheet (reflecting member) 26 arranged as a layer under the light guide plate 24, and a panel support frame (panel support member) 27 that surrounds the light guide plate 24 and the optical sheet 25 and supports the liquid crystal panel 11 from the rear side (opposite side to the side of the cover panel 12). In the backlight device 13, the LEDs 22 are disposed in an uneven manner at one of short-sides of the peripheral portion in what is known as a one-side-incident edge lit type (side lit type). In the following, the components of the backlight device 13 will be described sequentially.

The LEDs 22 are configured, as illustrated in FIG. 5, with the LEDs 22 chips sealed by a resin material on a substrate portions fixed to a plate surface of the LED substrate 23. The LED chips mounted on the substrate portion are formed from, for example, an InGaN material and have a single main emission wavelength. Specifically, the wavelength is in the range 435 nm to 480 nm, that is, including a single peak wavelength in the blue wavelength region. Hence, the LED chips emit only blue light. It is preferable that the main emission wavelength of the LED chips be 440 nm to 460 nm. For example, the main emission wavelength may be 451 nm. As a result, the LED chips emit single-color blue light with a high level of color purity. The resin material sealing the LED chips has dispersed therein phosphors that are excited by the blue light emitted from the LED chips and emit light of prescribed colors. Thus, overall, substantially white light is emitted. For the phosphors, a material that appropriately combines phosphors selected from a yellow phosphor that emits yellow light, a green phosphor that emits green light, and a red phosphor that emits red light may, for example, be used. Alternatively, one of these phosphors can be used alone. In the LEDs 22 the side surface adjacent to the surface mounted on the LED substrate 23 formed the light-emitting surface. In other-words, the LEDs 22 are of the side-surface emitting type.

As illustrated in FIGS. 1 and 5, the LED substrate 23 includes a film-like (sheet-like) base material that is made of an insulating material that is flexible. The LEDs 22 are surface mounted on the base material, and the LED substrate 23 is patterned with a wiring pattern for supplying electrical power to the LEDs 22. The LED substrate 23 is disposed at one of the short sides of the backlight device 13, extending along the short-side direction (Y-axis direction) of the backlight device 13. On the LED substrate 23, a plurality of the LEDs 22 are mounted along the extension direction so to have gaps therebetween. The LED substrate 23 is arranged so as to be sandwiched between the liquid crystal panel 11 and the later-described panel support frame 27 in the thickness direction (Z-axis direction) of the backlight device 13. Accordingly, the mounting surface for the LEDs 22 of the LED substrate 23 is set to face the rear side (opposite side to the side of the liquid crystal panel 11).

As illustrated in FIGS. 1 and 5, the light guide plate 24 has a vertically long plate form including a plate surface that is parallel to the plate surface of the liquid crystal panel 11. Of the peripheral end faces, the end face of one short side that is the life left side in FIG. 5 (front side in FIG. 1) is a light-receiving face 24a that opposes the LEDs 22 and receives light. Of the light guide plate 24, the plate surface facing the front side (liquid crystal panel 11 side) is a light-exiting surface 24b that emits the light toward the liquid crystal panel 11. Further, of the peripheral end faces of the light guide plate 24, the three end faces besides the light-receiving face 24a, which is to say the end face 24d on the opposite side to the light-receiving face 24a and the pair of long-side end faces 24e, are LED non-facing end faces (light source non-facing end faces) 24d and 24e that do not face the LEDs 22. Note also that the arrangement direction of the light guide plate 24 and the LEDs 22 matches the long-side direction of the light guide plate 24 (Y-axis direction).

As illustrated in FIGS. 1 and 5, the optical sheet 25 is mounted on the light-exiting surface 24b of the light guide plate 24, sandwiched between the liquid crystal panel 11 and the light guide plate 24. Thus, the optical sheet 25 transmits light emitted from the light guide plate 24 and emits the transmitted light towards the liquid crystal panel 11 while imparting a prescribed optical effect. The optical sheet 25 is a plurality of sheets (three in the present embodiment) stacked on top of one another. Like the optical sheet 25, the light guide plate 24 has a vertically long rectangular form when seen in plan view. The size of the optical plate 25 when seen in plan view (long-side dimension and short-side dimension) is set to be larger than the light guide plate 24, and smaller than the array substrate 11b of the liquid crystal panel 11. Specifically, the optical sheet 25 of the present embodiment includes three sheets, which are, stated in order from the light guide plate 24 side, a diffusion sheet (light diffusing member) 25a, a first lens sheet (first focusing member, focusing member) 25b, and a second lens sheet (second focusing member, focusing member) 25c. Of these sheets, the diffusion sheet 25a has diffusing effect on light from the light guide plate 24, while the first lens sheet 25b and the second lens sheet 25c have a focusing effect on the light from the diffusion sheet 25a. Note that a specific configuration of the diffusion sheet 25a is described again in greater detail in a later section.

As illustrated in FIGS. 1 and 5, the reflective sheet 26 is arranged in a form covering the plate surface 24c on the rear side of the light guide plate 24 (opposite side to the light-exiting surface 24b). The reflective sheet 26 is formed from a synthetic resin sheet material that is white and has a highly reflective surface. Hence, light propagating within the light guide plate 24 is efficiently directed towards the front side (light-exiting surface 24b). Like the light guide plate 24, the reflective sheet 26 has a vertically long rectangular form when seen in plan view. The size of the reflective sheet 26 when seen in plan view (long-side dimension and short-side dimension) is set to be larger than the light guide plate 24, and approximately the same as the array substrate 11b of the liquid crystal panel 11. The reflective sheet 26 overlaps, when seen in plan view, substantially the entire area of the liquid crystal panel 11 (display area AA and the non-display area NAA) and an inner peripheral portion of the later-described panel support frame 27. Note that at least one of the light-exiting surface 24b of the light guide plate 24 and the plate surface 24c on the opposite side thereof is patterned so as to have a scattering portion (not shown in the drawings) with a prescribed internal distribution for diffusing internal light. Thus, light being reoriented by the reflective sheet 26 and emitted from the light-exiting surface 24b is controlled to be uniformly distributed with the surfaces.

The panel support frame 27 is made of synthetic resin and, as illustrated in FIG. 1, has an external form that, like the cover panel 12, is vertically long and substantially frame-like. Further, the panel support frame 27 houses, on an inner side thereof, the liquid crystal panel 11, the light guide plate 24 and the optical sheet 25. The panel support frame 27 is formed by linking pair of short side portions that extend in the X-axis direction with a pair of long side portions that extend in the Y-axis direction. The panel support frame 27 opposes the plate surface on the rear side of the peripheral edge portion of the cover panel 12 where the light-shielding portion 12a is formed and the peripheral edge portion (a portion) of the non-display area NAA of the liquid crystal panel 11, allowing the plate surface to be supported around the entire circumference from the rear side. Further, the panel support frame 27 supports a greater portion of the peripheral edge portion of the optical sheet 25 from the rear side.

As illustrated in FIG. 5, a cross-sectional profile panel support frame 27 has a substantially stepped form with three levels. A highest level, first level portion 27a, supports the peripheral edge portion of the cover panel 12 from the rear side, a second highest level, second level portion 27b, supports the peripheral edge portion of the non-display area NAA of the liquid crystal panel 11 from the rear side, and a lowest level, third level portion 27c, supports the peripheral edge portion of the optical sheet 25 from the rear side. Interposing between the second level portion 27b of the panel support frame 27 and the liquid crystal panel 11 is panel-use adhesive tape (panel-use adhesive member) that adheres to both items. As a result of the panel-use adhesive tape 28, the liquid crystal panel 11 and the panel support frame 27 are maintained in an attached state. The panel-use adhesive tape 28 is a flexible tape-like base material having an adhesive agent coated on both sides thereof, and, as a whole, has a vertically long, substantially frame-like form to match the form of the panel support frame 27, which is the adhesion target (FIG. 1). As a result of the panel-use adhesive tape 28, the liquid crystal panel 11 and the panel support frame 27 are adhered around substantially an entire periphery. A width dimension of the panel-use adhesive tape 28 with the substantially frame-like form is substantially the same as, or slightly narrower than a width dimension of the second level portion 27b of the panel support frame 27. Note that while the first level portion 27a and the second level portion 27b are provided on the short side portion of the panel support frame 27 on the side of the LEDs 22, the third level portion 27c is not provided in this location. Also, the LED substrate 23 is mounted on the second level portion 27b (FIG. 5). The LED substrate 23 is sandwiched between the second level portion 27b of the panel support frame 27 and the end portion of the array substrate 11b of the liquid crystal panel 11.

The casing 14 is formed from a synthetic resin material or a metal material, and, as illustrated in FIGS. 1 and 5, has a substantially concave form (substantially bowl-like form) with the opening facing towards the front side. A housing space maintained inside the casing 14 comfortably houses the cover panel 12, the liquid crystal panel 11 and the backlight device 13. Hence, the casing 14 covers the backlight device 13 from the rear side and covers the sides over the entire circumference of the backlight device 13 and the cover panel 12, thereby configuring the external appearance of the back surface and side surfaces of the liquid crystal display device 10. Casing-use adhesive tape (casing-use adhesive member) 29 is interposed between the portion of the casing 14 that opposes the panel support frame 27 configuring the backlight device 13, and a surface on the rear side of the panel support frame 27. As a result of the casing-use adhesive tape 29, the casing 14 and the panel support frame 27 are held in an attached state. The casing-use adhesive tape 29 has, as a whole, a vertically long, substantially frame-like form, matching the form of the panel support frame 27, which is the adhesion target. Hence, the casing 14 and the panel support frame 27 are adhered to each other around substantially the entire periphery thereof. A portion of the casing-use adhesive tape 29 is also adhered to a peripheral edge portion of the reflective sheet 26. Further, the casing-use adhesive tape 29 is a flexible tape-like base material having an adhesive agent coated on front rear sides, and is an identical member to the above-described panel-use adhesive tape 28. A space left to the rear side of the backlight device 13 in the housing space of the casing 14 houses various boards not shown in the drawings, such as a control substrate for controlling the driving of liquid crystal panel 11 and an LED driving substrate for supplying electrical power to drive the LEDs 22.

However, in the edge-light type backlight device 13 of the form described above, the light emitted from the LEDs 22 is incident on the light-receiving face 24a of the light guide plate 24 and is then propagated within the light guide plate 24 as result of being reflected by the reflective sheet 26 and fully reflected by the light-exiting surface 24b and peripheral end faces. Thereafter, the propagated light is emitted to the exterior of the light guide plate 24 from the light-exiting surface 24b. In this process, shorter wavelength light contained in the light emitted from the LEDs 22, such as light in the blue wavelength region, is more easily absorbed by the light guide plate 24 itself than longer wavelength light, such light in the yellow or red wavelength bands. Hence, as one moves further away from the LEDs 22 on the light-exiting surface 24b of the light guide plate 24, a brightness of shorter wavelength light is, relatively speaking, reduced while a brightness of longer wavelength light is, relatively speaking, increased. Consequently, the emitted light tends to take on a yellow tinge. As a result, there is a risk that color variation will occur in the light emitted from the light guide plate 24. In particular, as a screen size of the liquid crystal display device 10 increases, optical path lengths of the light propagating within the light guide plate 24 (that is, the distance from the light-receiving face 24a to the end face 24d on the opposite side, or the dimension of light guide plate 24 in arrangement direction of the LEDs 22 and the light guide plate 24) increase. The greater this increase, the more likely it is that color variations of the type described above will occur.

Figure 6:
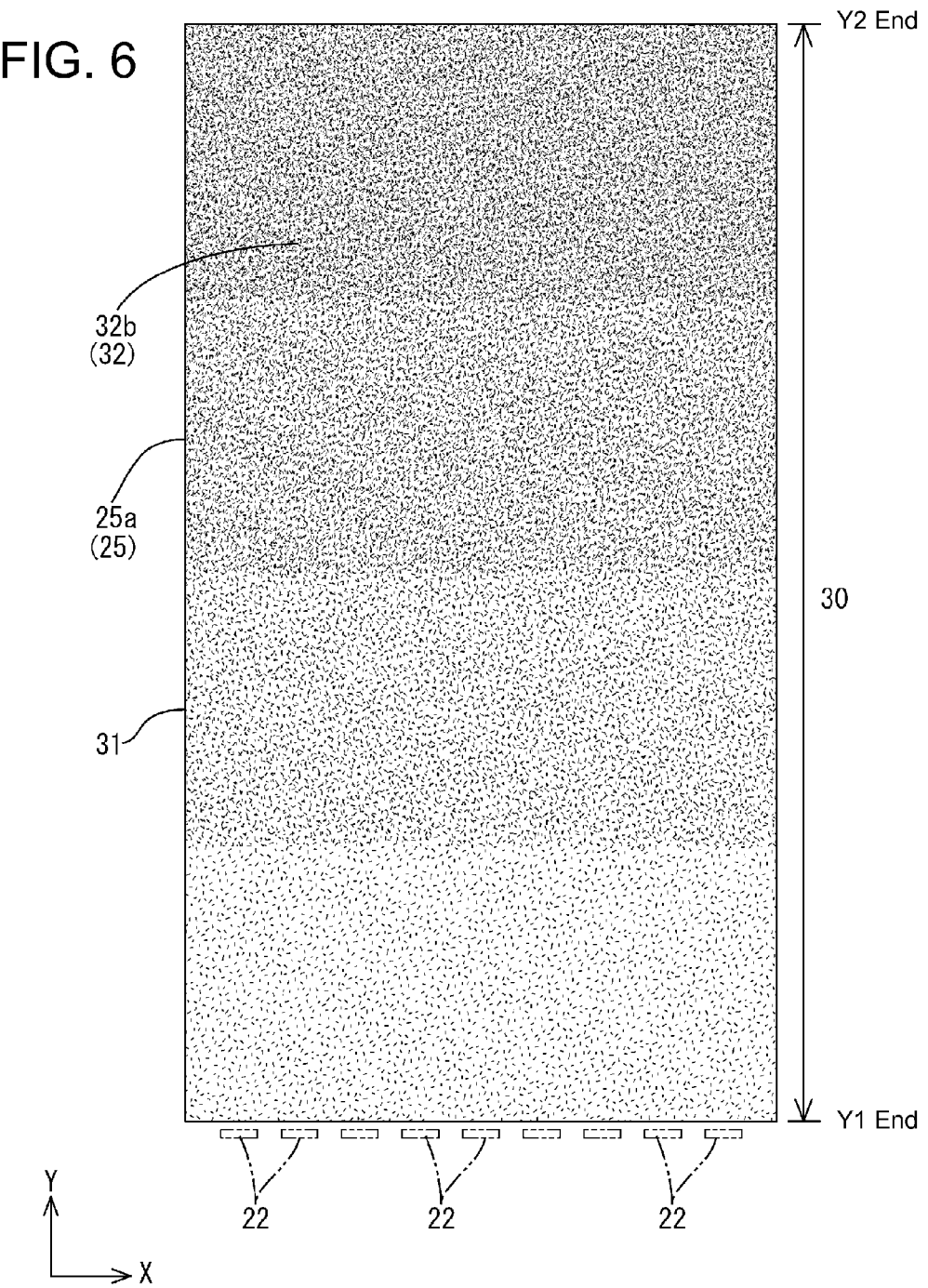
FIG. 6 is a plan view of a diffusion sheet included in an optical sheet.
Figure 8:
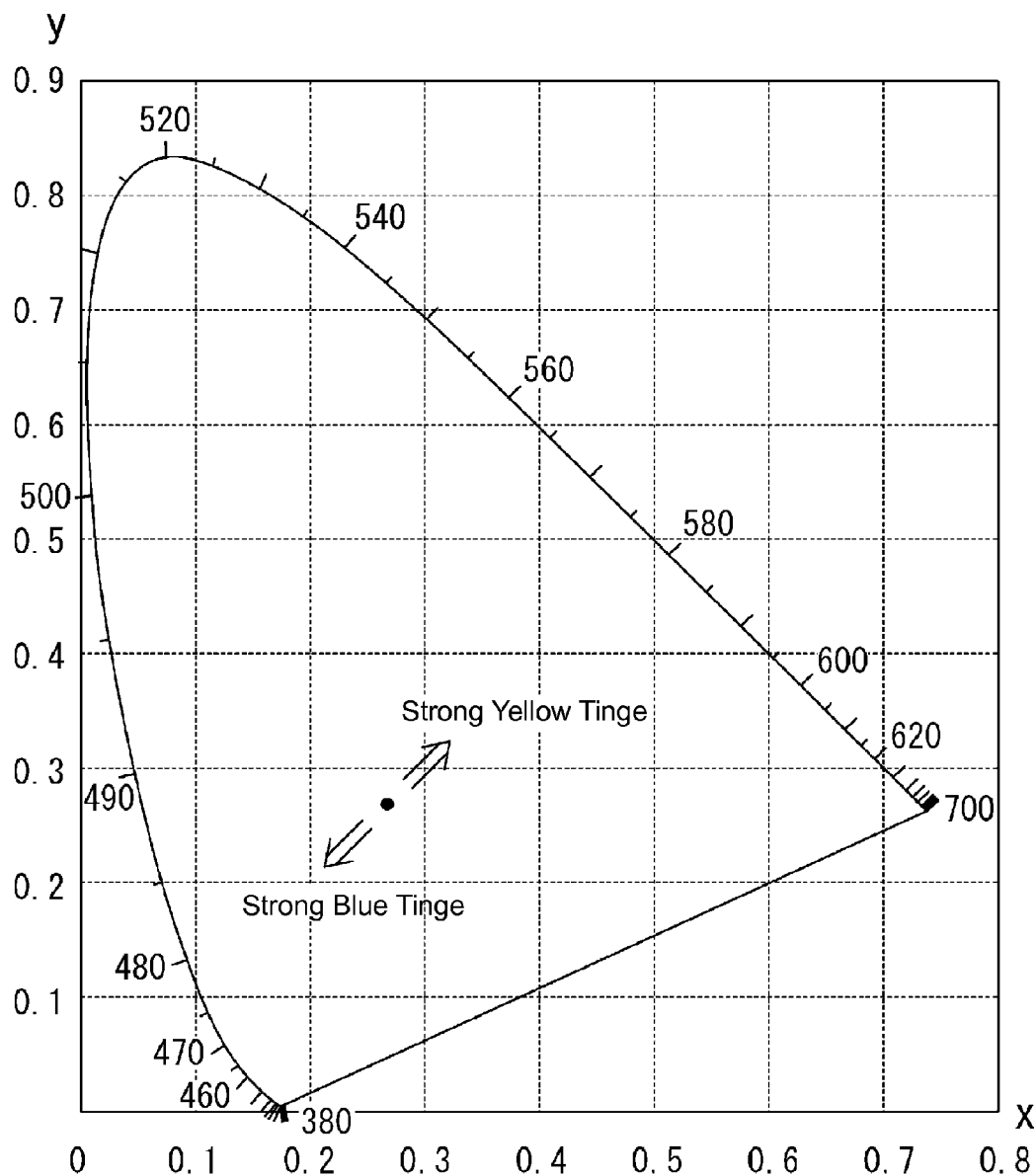
FIG. 8 is a 1931 color space chromaticity diagram by the Commission Internationale de l'Eclairage (CIE).

Thus, in the present embodiment, the diffusion sheet 25a included in the optical sheet 25 is arranged on the front side, as illustrated in FIG. 6, so as to oppose the light-exiting surface 24b of the light guide plate 24 is configured to have a chromaticity correction region 30 that is configured to transmit light having x and y chromaticity coordinate values in the Commission Internationale de l'Eclairage (CIE) 1931 color space that both decrease further away from the LEDs 22 when receiving a reference white light, the chromaticity correction region thereby compensating for a chromaticity distribution that is generated by the light guide plate processing the light from the light source so as to emit light that has substantially uniform chromaticity across the chromaticity correction region when processing the light originating from the light source. With the chromaticity correction region 30, although color variation of the type described above still occurs in the light emitted from the light guide plate 24, when the emitted light passes through the diffusion sheet 25a, transmission of longer wavelength light is suppressed, the level of suppression increasing with distance from the LEDs 22. Hence, the chromaticity of the light transmitted from the diffusion sheet 25a is homogenized, and thus, color variation in light emitted from the backlight device 13 after transmission by the diffusion sheet 25*a* is less likely to occur. In the following, chromaticity coordinate values (x1, y1) in the CIE 1931 color space of the chromaticity of the transmitted light from the chromaticity correction region 30. The CIE 1931 color space is as illustrated in FIG. 8. The horizontal x-axis and vertical y-axis indicate x values and y values that are chromaticity coordinate values. A point W in FIG. 8, which shows the CIE 1931 color space, represents a white reference chromaticity. As the x value and y value are decreased from point W that is the white reference chromaticity, the blue tinge grows stronger. Conversely, as the x value and the y value are both increased, the yellow tinge grows stronger. The following is a detailed description of the configuration of the diffusion sheet 25*a* and the chromaticity distribution of the chromaticity correction region 30.

Figure 7:
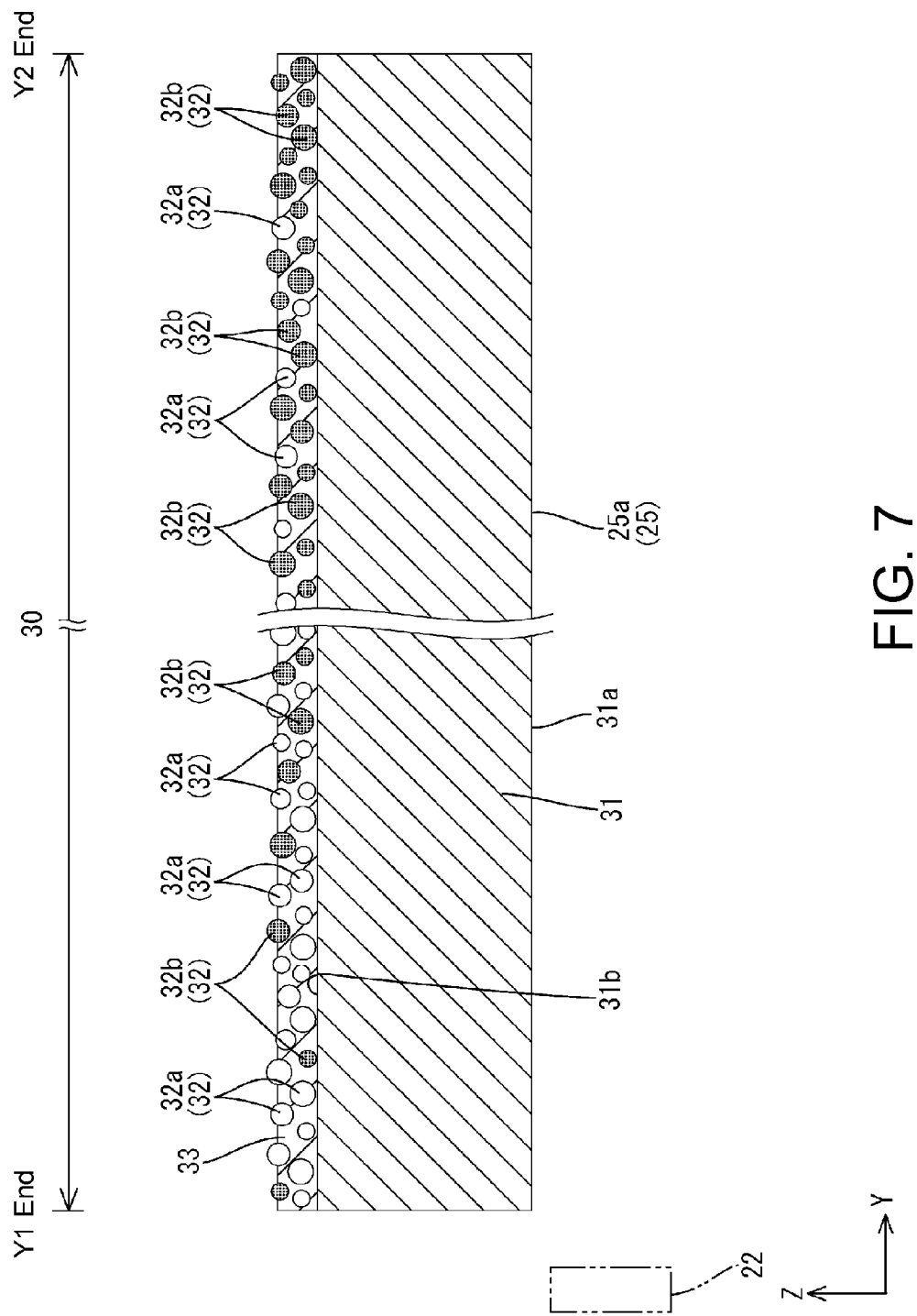
FIG. 7 is a cross-sectional view of the diffusion sheet taken along a long-side direction (Y-axis direction).

Next, the configuration of the diffusion sheet 25*a* is described in detail. As illustrated in FIGS. 6 and 7, the diffusion sheet 25*a* includes at least a transparent base material 31 having a sheet-like form, light diffusing particles 32 that are provided on the transparent base material 31 and cause light diffusion, and a fixing layer 33 that fixes the light diffusing particles 32 on a surface of the transparent base material 31. The transparent base material 31 is, for example, formed from a thermoplastic resin material with excellent transparency, such as PET, and has a sheet-like form of a prescribed thickness. A rear side sheet surface forms a light-receiving face 31*a* where light is incident from the light guide plate 24, while a front side sheet surface forms a light-exiting surface 31*b* where light is emitted to the first lens sheet 25*b*. Note that in FIGS. 6 and 7, the LEDs 22 are schematically depicted using a chain double-dashed line to show the position of the LEDs 22 relative to the diffusion sheet 25*a*.

The light diffusing particles 32 are substantially spherical and are formed from a resin material that is substantially transparent. The material may be an inorganic material such as silica, aluminum hydroxide, or zinc oxide, or an organic material such as acrylic resin, polyurethane or polystyrene. As illustrated in FIGS. 6 and 7, a great number of the light diffusing particles 32 are distributed within the later-described fixing layer 33. The light diffusing particles 32 are arranged in a distribution density that is substantially constant over substantially an entire area of the light-exiting surface 31*b* of the transparent base material 31. As a result, the light emitted from the light-exiting surface 24*b* of the light guide plate 24 can be substantially uniformly diffused at the surface of the light-exiting surface 31*b* of the transparent base material 31. Moreover, the light diffusing particles 32 include two types of particle, colorless light diffusing particles 32*a* that are almost colorless, and blue-colored light diffusing particles 32*b* that are blue, blue being the complementary color to yellow. Note that in FIG. 6, the colorless light diffusing particles 32*a* are omitted and the distribution density of the blue-colored light diffusing particles 32*b* is indicated using a dot pattern. Further, in FIG. 7, the blue-colored light diffusing particles 32*b* are indicated using hatching. The colorless light diffusing particles 32*a* have a substantially constant visible light transmittance (absorptivity) over the entire wavelength region, and the transmitted light (diffused light) free from tinges of any particular color. On the other hand, the blue-colored light diffusing particles 32*b* have, for example, a higher absorptivity for light in the wavelength region corresponding to yellow of visible light than for light in other wavelength regions, with result that the transmitted light (diffused light) looks blue. This can be rephrased as, the blue-colored light diffusing particles 32*b* have, for example, a lower transmittance for light in wavelength region corresponding to yellow of visible light than for light in other wavelength regions, with the result that the transmitted light (diffused light) looks blue. Note that, as an alternative to what is described above, a configuration is possible in which the blue-colored light diffusing particles 32*b* have, for example, a higher absorptivity (lower transmittance) for light in the wavelength region corresponding to yellow of visible light and for light in the wavelength region corresponding to green, than for light belonging to other wavelength regions, with the result that the transmitted light looks blue.

The main ingredient of the fixing layer 33 is a resin material having excellent transparency such as acrylic resin, polyurethane, polyester, silicone resin, epoxy resin or a UV-cured resin. As illustrated in FIGS. 6 and 7, the fixing layer 33 is formed as multiple layers so as to cover substantially the entire area of the light-exiting surface 31*b* of the transparent base material 31. When manufacturing the diffusion sheet 25*a*, a liquid state is formed by adding a solvent or the like to the resin material that is the main ingredient of the fixing layer 33, and dispersing the great number of light diffusing particles 32 in the resulting liquid. By coating the liquid coated on the light-exiting surface 31*b* of the transparent base material 31 and then curing, the fixing layer 33 containing the light diffusing particles 32 can be integrally formed in multiple layers on the transparent base material 31.

Figure 10:
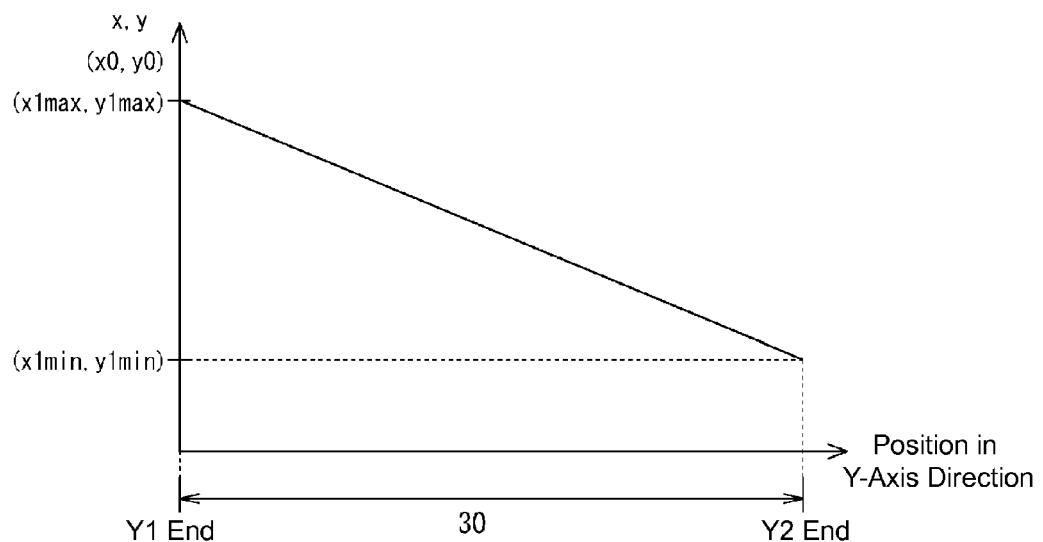
FIG. 10 is a graph showing a change in the chromaticity coordinate values going from a Y1 end to a Y2 end of the diffusion sheet.

In an portion where the diffusion sheet 25*a* of the present embodiment overlaps (when viewing along a normal direction to the plate surface) the light guide plate 24, as illustrated in FIGS. 6 and 7, the mixing ratio (distribution density) of the colorless light diffusing particles 32*a* and the blue-colored light diffusing particles 32*b* is arranged to vary with distance from the LEDs 22 in the Y-axis direction. Specifically, the mixed proportion (distribution density) of the blue-colored light diffusing particles 32*b* is set to increase as the distance from the LEDs 22 increases, and the mixed proportion (distribution density) of the colorless light diffusing particles 32*a* is set to decrease as the distance from the LEDs 22 increases. Thus, the transmitted light from the diffusion sheet 25*a* has no specific color tinge at the end on the side of the LEDs 22, but has a tinge of blue, the complementary color to yellow, at the end on the opposite side to the side of the LEDs 22, with the blue tinge becoming progressively darker as one moves from the end on the side of the LEDs 22 to the end on the opposite side to the side of the LEDs 22. As a result, the diffusion sheet 25*a* can be the to have a chromaticity correction region 30 (FIG. 10) with a chromaticity distribution in which chromaticity coordinate values (x1, y1) in the CIE 1931 color space for the chromaticity of the transmitted light decrease as one moves away from the LEDs 22 (and increase as one moves towards the LEDs 22). Note that the distribution density of the light diffusing particles 32 (colorless light diffusing particles 32*a* and blue-colored light diffusing particles 32*b*) within the light-exiting surface 31*b* of the transparent base material 31 is substantially constant over the entire area of the surface. The blue-colored light diffusing particles 32*b* are contained, albeit in very small amounts, in proximity to the end of the diffusion sheet 25*a* at the side of the LEDs 22. Thus, the chromaticity correction region 30 is disposed over substantially the entire area of the diffusion sheet 25*a*. The blue-colored light diffusing particles 32*b* are distributed in such a way that the mixed proportion in the light diffusing particles 32 is continuously and gradually increased as the distance from the LEDs 22 increases. Accordingly, the chromaticity correction region 30 has a gradation-form chromaticity distribution in which the chromaticity coordinate values (x1, y1) gradually and continuously decrease as one moves away from the LEDs 22 (FIG. 10). Note also that the colorless light diffusing particles 32a are distributed in such a way that the mixed proportion in the light diffusing particles 32 is continuously and gradually decreased as the distance from the LEDs 22 increases.

Figure 9:
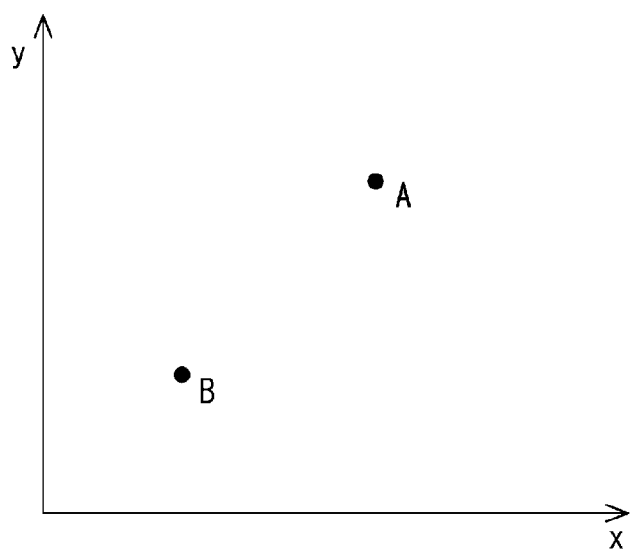
FIG. 9 is an enlarged view of a main portion of FIG. 8.

Next, the chromaticity of the chromaticity correction region 30 will be described in detail with reference to FIGS. 9 and 10. FIG. 9 is an enlarged view of the CIE 1931 color space in which point A represents a chromaticity at the end of the diffusion sheet 25a on the side of the LEDs 22, and point B represents a chromaticity at the end of the diffusion sheet 25a on the opposite side to the side of the LEDs 22. Hence, the chromaticity of the chromaticity correction region 30 is set to vary with distance from the LEDs 22 on a line (straight line) linking point A with point B. For example, as one moves from the end on the side of the LEDs 22 to the end on the opposite side, the chromaticity of the chromaticity correction region 30 varies linearly going from point A to point B, meaning that the chromaticity coordinate values (x1, y1) continuously and gradually decrease. The chromaticity coordinate values at point A are the maximum values of the chromaticity coordinate values (x1, y1) in the chromaticity correction region 30, and are referred to in the following as "x1max" and "y1max". The chromaticity coordinate values at point B are the minimum values of the chromaticity coordinate values (x1, y1) in the chromaticity correction region 30, and are referred to in the following as "x1min" and "y1min". FIG. 10 is graph plotting the chromaticity coordinate values x and y from a Y1 end, which is the end of the reflective sheet 26 on the side of the LEDs 22 illustrated in FIG. 6, to a Y2 end, which is the end of the reflective sheet 26 on the opposite side to the LEDs 22. Note that in the graph of FIG. 10, the x value and the y value are shown, for convenience, on the same coordinate axis, thus indicating that the values (magnitudes) of x and y have identical tendencies between the Y1 end and the Y2 end. This does not necessarily mean, however, that the x value and the y value are identical values. In other words, at point A the x value (x1max) and y value (y1max) may be the same or may be different, and at point B the x value (x1min) and y value (y1min) may be the same or may be different.

The coordinates at point A (x1max, y1max), which are the maximum values of the chromaticity coordinate values in the chromaticity correction region 30, are substantially equal to the chromaticity coordinate values of the white reference chromaticity (x0, y0). Hence, the coordinates at point B (x1min, y1min), which are the minimum values of the chromaticity coordinate values in the chromaticity correction region 30, are smaller than the coordinate values of the white reference chromaticity (x0, y0). Thus, the above-described x values of the chromaticity coordinate values (x1min, x1max and x0) have a relative magnitude that satisfies Formula (1) and the chromaticity coordinate values (y1min, y1max and y0) have a relative magnitude that satisfies Formula (2). Note that in the present embodiment, "white reference chromaticity" is the chromaticity of the light emitted by the LEDs 22 included in the backlight device 13, and has chromaticity coordinate values (x0, y0) of, for example (0.272, 0.277). The chromaticity coordinate values of point A and point B in the chromaticity correction region 30 are obtained by illuminating the diffusion sheet 25a with light emitted from the LEDs 22 included in the backlight device 13 and measuring the transmitted light using a colorimeter or the like.

[Formula 1]

$$x1min < x1max = x0 \quad (1)$$

[Formula 2]

$$y1min < y1max = y0 \quad (2)$$

The present embodiment has the above-described construction. The effects of the same are described below. When the light source of the liquid crystal display device 10 of the above-described configuration is turned ON, driving of the liquid crystal panel 11 and driving of the LEDs 22 of the LED substrate 23 are controlled by control circuits not shown in the drawings. Light from the LEDs 22 is guided by light guide plate 24 and is subjected to prescribed optical effects by the optical sheet 25. As a result, the liquid crystal panel 11 is illuminated with homogenized planar light and a prescribed image is displayed on the liquid crystal panel 11. The following is a detailed description of the effects of the light guide plate 24.

When the LEDs 22 are turned ON, the emitted light enters into the light guide plate 24 from the light-receiving face 24a that forms an one end face on the short side the light guide plate 24 as illustrated in FIG. 5, and, due to being fully reflected by the reflective sheet 26 and by boundary surfaces with exterior portions (light-exiting surface 24b and peripheral end faces), propagates within the light guide plate 24. For light propagating within the light guide plate 24, scattering by the scattering portion prevents an angle of incidence on the light-exiting surface 24b from exceeding a critical angle. The light is therefore emitted to the exterior to the front side (side of the liquid crystal panel 11) from the light-exiting surface 24b. Here, of the light propagating within the light guide plate 24, the shorter wavelength light tends to be more easily absorbed by the resin material that forms the light guide plate 24 than the longer wavelength light. Hence, in the light emitted from the light-exiting surface 24b, the amount of shorter wavelength light becomes, relatively speaking, smaller as one moves away from the LEDs 22 (as one approaches the end face 24d of the light guide plate 24 on the opposite side to the light-receiving face 24a) and the amount of longer wavelength light becomes larger. Consequently, color variation occurs whereby the yellow tinge becomes darker as one moves away from the LEDs 22. In particular, in configurations in which the arrangement direction of the LEDs 22 and light guide plate 24 match the long-side direction of the rectangular light guide plate 24, the light propagating within the light guide plate 24 tend to have a longer optical path, and, consequently, there is a risk that the above-described color variation will be more marked.

To solve this problem, in the present embodiment, a diffusion sheet 25a for diffusing light emitted from the light guide plate 24 includes, as illustrated in FIGS. 6 and 7, the chromaticity correction region 30 for which x and y chromaticity coordinate values in the CIE 1931 color space both decrease as one moves away from the LEDs 22. Hence, when the light emitted from the light-exiting surface 24b of the light guide plate 24 passes through the chromaticity correction region 30 of the diffusion sheet 25a, transmission of longer wavelength light is suppressed, with the level of suppression increasing with distance from the light source. More specifically, the distribution density blue-colored light diffusing particles 32b provided on the diffusion sheet 25a is arranged so that the mixed proportion increases as one moves away from the LEDs 22. Thus, the light is transmitted in such a way that longer wavelength light contained in the light emitted from the light-exiting surface 24b of the light guide plate 24 is absorbed in larger quantities by the blue-colored light diffusing particles 32b. Hence, the transmitted light from the diffusion sheet 25a contains a good balance of longer wavelength light and shorter wavelength light over substantially the entire area of the surface. Thus, even if color variation of the type in which a yellow tinge appears in the light emitted from the light-exiting surface 24b of the light guide plate 24 as one moves further away from the LEDs 22, transmission through the chromaticity correction region 30 of the diffusion sheet 25a corrects the chromaticity and promotes homogenization of the transmitted light. According to the above, it is less likely that color variation will occur in the light emitted from the backlight device 13 after transmission through the diffusion sheet 25a. Hence, the image to be displayed by the liquid crystal display device 10 can be displayed with a high display quality and without color variation. Even in configurations in which the arrangement direction of the LEDs 22 and the light guide plate 24 match the long-side direction of the rectangular light guide plate 24, the chromaticity of the transmitted light is appropriately corrected by the chromaticity correction region 30 of the diffusion sheet 25a, thereby enabling effective suppression of the occurrence of color variation. Moreover, since the above described problem of color variation has a tendency to become more marked as the screen size of the liquid crystal display device 10 increases, the solution to the problem of color variation using the above-described configuration is suitable for promoting the shift to increased screen sizes in the liquid crystal display device 10.

As described above, the backlight device (illumination device) 13 of the present embodiment includes: LEDs (light source) 22; a light guide plate 24 including a light-receiving face 24a that opposes the LEDs 22 and where light from the LEDs is incident, and a light-exiting surface 24 where the incident light is emitted; and an optical sheet (optical member) 25 that is arranged in a form opposed to the light-exiting surface 24b of the light guide plate 24 and imparts an optical effect on light emitted from the light-exiting surface 24b, the optical sheet 25 having, in at least one portion thereof, a chromaticity correction region 30 for which x and y chromaticity coordinate values in an CIE 1931 color space both decrease with distance from the LEDs 22.

With such an arrangement, the light form the LEDs 22 incident on the light-receiving face 24a of the light guide plate 24 propagates within the light guide plate 24 and is subsequently emitted from light-exiting surface 24b. Shorter wavelength light contained in the light propagating within the light guide plate 24 tends to be more easily absorbed by the light guide plate 24 than longer wavelength light. Hence, there is a tendency for an amount of shorter wavelength light in the light incident on the light-receiving face 24a to decrease as a distance of propagation within the light guide plate 24 lengthens, and, consequently, color variation occurs in the light emitted from the light-exiting surface 24b.

To solve this problem, the optical sheet 25 arranged in a form opposed to the light-exiting surface 24b of the light guide plate 24 has, in at least one portion thereof, a chromaticity correction region 30 for which x and y chromaticity coordinate values in an CIE 1931 color space both decrease with distance from the LEDs 22. Hence, while color variation of the type described above still occurs in the light emitted from the light-exiting surface 24b of the light guide plate 24, when this light passes through the optical sheet 25, transmission of longer wavelength light is suppressed, with the level of suppression increasing with distance from the LEDs 22. Thus, the chromaticity of the transmitted light from the optical sheet 25 is corrected and homogenized, and, consequently, color variation in the light transmitted through the optical sheet 25 and emitted from the backlight device 13 is less likely to occur.

Further, when chromaticity coordinate values of the CIE 1931 color space of the chromaticity correction region 30 are denoted (x1, y1), and the chromaticity coordinate values in the CIE 1931 color space used as a white reference chromaticity are denoted (x0, y0), the optical sheet 25 is configured so that a minimum value of x1 is smaller than x0, and a minimum of value of y1 is smaller than y0 in the chromaticity correction region 30. With such a configuration, the minimum values of x1 and y1 in the chromaticity correction region 30 are smaller than x0 and y0 of the white reference chromaticity, respectively. Consequently, the transmitted light from the chromaticity correction region 30 is corrected further towards blue as one moves further from the LEDs 22. For example, in the process of light being propagated within the light guide plate 24, in the particular case that light in the blue, long wavelength region is absorbed by the light guide plate 24, the light emitted from the light-exiting surface 24b would normally become more yellow as one moves further away from the LEDs 22. However, in the above-described arrangement, the transmitted light from the chromaticity correction region 30 of the optical sheet 25 is corrected further towards blue, which is the complementary color for yellow, as one moves further away from the LEDs 22. Hence, it is possible to promote favorable homogenization in the chromaticity of the transmitted light from the optical sheet 25.

Further, the optical sheet 25 is configured so that a maximum value of x1 is approximately equal to x0, and a maximum value of y1 is approximately equal to y0 in at least the chromaticity correction region 30. With such a configuration, the maximum values of x1 and y1 in the chromaticity correction region 30 are smaller than x0 and y0 of the white reference chromaticity, respectively. Consequently, the transmitted light from the chromaticity correction region 30 is corrected further towards blue as one moves further from the LEDs 22. For example, in the case that the light guide plate 24 is increased in size, lengthening the optical path of the light propagating within the light guide plate 24, light emitted from the light-exiting surface 24b would normally become strongly yellow as one moves further away from the LEDs 22. However, in the above-described arrangement, all the transmitted light from the chromaticity correction region 30 of the optical sheet 25 is corrected further towards blue, which is the complementary color for yellow, as one moves further away from the LEDs 22. Hence, it is possible to promote favorable homogenization of chromaticity for the transmitted light from the optical sheet 25, even in the case of a large-sized backlight device 13.

Further, the optical sheet 25 may be configured so that the x value and the y value in the chromaticity correction region 30 both gradually decrease in a continuous manner as one moves further away from the LEDs 22. With such a configuration, when the light emitted from the light-exiting surface 24b of the light guide plate 24 is passing through the optical sheet 25, the transmittance of the longer wavelength light by the chromaticity correction region 30 gradually decreases in a continuous manner as one moves further from the LEDs 22. Thus, the chromaticity of the transmitted light can be more appropriately corrected, and color variation in light emitted from the backlight device 13 after passing through the optical sheet 25 is less likely to occur.

The light guide plate 24 has a rectangular form when seen in plan with one short-side end face being the light-receiving face 24a and a short-side end face 24d on an opposite side to the light-receiving face 24a and a pair of long-side end faces 24e being LED non-facing end faces (light source non-facing end faces) 24d that do not oppose the LEDs 22, and the optical sheet 25 follow the light guide plate 24 in being rectangular when viewed in plan, and at least an end portion of the optical sheet 25, on an opposite side to a side of the LEDs 22, is the chromaticity correction region 30. With this configuration in which one short-side end face of the light guide plate 24 having a rectangular form when seen in plan opposes the LEDs 22, light that is incident on the light-receiving face 24a of the light guide plate 24 tends to have a long optical path to reach the light source non-facing end face 24d on the opposite side to the light-receiving face 24a. Hence, there is a tendency for an amount of shorter wavelength light absorption by the light guide plate 24 to increase as one approaches the LED non-facing end face on the opposite side to the light-receiving face 24a. Thus, when the light emitted from the light-exiting surface 24b of the light guide plate 24 is passing through the optical sheet 25 in the manner described above, the transmittance of the longer wavelength light by the chromaticity correction region 30 decreases as one moves further from the LEDs 22. Hence, the chromaticity of the transmitted light can be appropriately corrected, and color variation in light emitted from the backlight device 13 after passing through the optical sheet 25 is less likely to occur.

Further, all regions of the optical sheet 25 form the chromaticity correction region 30. Even, for example, in the case that a specific color is imparted at a position extremely close to the light LEDs 22 to the light emitted from the light-exiting surface 24b of the light guide plate 24, since all regions of the optical sheet 25 form the chromaticity correction region 30 as described above, the chromaticity of transmitted light from the optical sheet 25 can be appropriately corrected.

Further, the optical sheet 25 includes at least a transparent base material 31, and a diffusion sheet (light diffusing member) 25a that is provided on the transparent base material 31 and includes at least light diffusing particles 32 that diffuse light, and at least a portion of the diffusion sheet 25a includes the chromaticity correction region 30. With this configuration, the light emitted from the light-exiting surface 24b of the light guide plate 24 is diffused by the light diffusing particles 32 provided on the transparent base material 31 when passing through the diffusion sheet 25a included in the optical sheet 25, making it less likely that brightness variation will occur. As a result of the chromaticity correction region 30 included in the diffusion sheet 25a, the chromaticity of the transmitted light from the diffusion sheet 25a is corrected and homogenized, and, consequently, color variation in the light emitted from the backlight device 13 is less likely to occur.

Further, the light diffusing particles 32 may include at least blue-colored light diffusing particles 32b that exhibit blue, and the diffusion sheet 25a is arranged so that, in the chromaticity correction region 30, a contained quantity of the blue-colored light diffusing particles 32b increases as one moves in a direction away from the LEDs 22. With this configuration, the light passing through the diffusion sheet 25a takes on a blue tinge when diffused by the blue-colored light diffusing particles 32b that exhibit blue. Since the contained quantity of the blue-colored light diffusing particles 32b in the chromaticity correction region 30 of the diffusion sheet 25a increases as one moves in the direction away from the LEDs 22, it becomes easier to impart the blue tinge to the transmitted light from the diffusion sheet 25a as one moves further away from the LEDs 22. As a result, the chromaticity of the transmitted light from the diffusion sheet 25a is corrected and homogenized, and, consequently, color variation in the light emitted from the backlight device 13 is less likely to occur.

Further, the light source may be the LEDs 22, the LEDs 22 including at least an LED chip (LED device) that emits substantially single-color light that is blue, and a phosphor that emits light under excitation by light from the LED chip. With this configuration, the light emitted from the LEDs 22 that form the light source includes a large amount of light in the blue wavelength region. Although there is a tendency for light in the blue, long wavelength region to be easily absorbed by the light guide plate 24 during the process of propagation within the light guide plate 24, when the light emitted from the light-exiting surface 24b of the light guide plate 24 is passing through the optical sheet 25 in the manner described above, the transmittance of the longer wavelength light by the chromaticity correction region 30 decreases as one moves further from the LEDs 22. Hence, the chromaticity of the transmitted light can be appropriately corrected, and light emitted from the backlight device 13 after passing through the optical sheet 25 is less likely to exhibit color variation.

Further, a liquid crystal display device (display device) 10 of the present embodiment includes any one of the backlight devices 13 devices described above and a liquid crystal panel (display panel) 11 that performs display using light from the backlight device 13. According to the liquid crystal display device 10, the occurrence of color variation in emitted light is suppressed and display of an excellent display quality can therefore be realized.

Further, the display panel is a liquid crystal panel 11 having liquid crystal interposed between a pair of substrates 11a and 11b. Such a display device may be the liquid crystal display device 10, and can be applied in various applications, such as in the display of mobile information terminals and the like.

Embodiment 2

Embodiment 2 of the present invention will be explained below with reference to FIG. 11. In Embodiment 2, a configuration in which a first lens sheet 125b includes a chromaticity correction region 130 is described. Note that repetitious description of structures, operations and effects similar to those of the above-described Embodiment 1 have been omitted.

Figure 11:
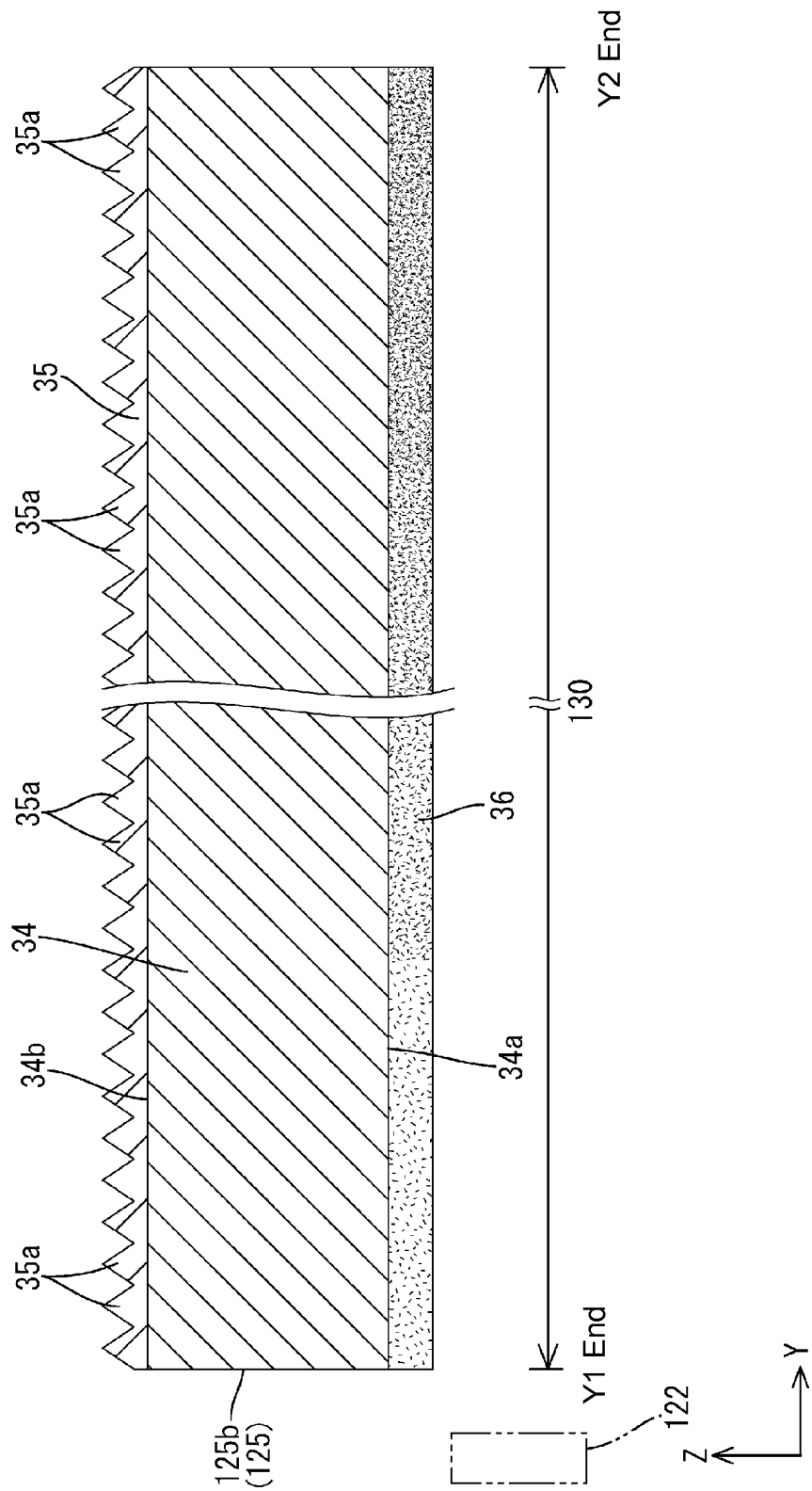
FIG. 11 is a cross-sectional view of a lens sheet according to Embodiment 2 of the present invention, taken along a long-side direction (Y-axis direction).

As illustrated in FIG. 11, the first lens sheet 125b of the present embodiment includes a transparent base material 34 having a sheet-like form, a lens film 35 that includes multiple prisms 35a and is provided on one plate surface of the transparent base material 34, and a blue colored film 36 that is provided on the other plate surface (opposite side to side of lens film 35) of the transparent base material 34. Note that in FIG. 11, LEDs 122 are schematically depicted using a chain double-dashed line to show the position of the LEDs 122 relative to the first lens sheet 125b. The transparent base material 34 is formed from a resin material with excellent transparency, and has a sheet-like form of a prescribed thickness. A rear side sheet surface forms a light-receiving face 34a where light is incident from a diffusion sheet not shown in the drawings, while a front side sheet surface forms a light-exiting surface 34b where light is emitted to a second lens sheet not shown in the drawings. The lens film 35 is formed from a substantially transparent resin material with excellent transparency, forms a film that is thinner than the transparent base material 34, and is attached in the form of a layer on the light-exiting surface 34b of the transparent base material 34. Of the lens film 35, the film surface on an opposite side to the side of the transparent base material 34 is provided with a multiple prisms 35a protruding to the front side. The prisms 35a have a substantially peaked profile when seen in a cross-sectional view taking along the Y-axis direction, and extend linearly along the X-axis direction. Further the multiple prisms 35a are provided in a parallel arrangement along the Y-axis direction.

The blue colored film 36 is formed from a substantially transparent resin material with excellent transparency having a pigment or dye distributed therein, forms a film that is thinner than the transparent base material 34, and is attached in the form of a layer on the light-receiving face 34a of the transparent base material 34. For the pigment or dye in the blue colored film 36, a material that exhibits blue is used. For the light that passes through the blue colored film 36, the pigment or dye that exhibits blue has, for example, a higher absorptivity (lower transmittance) for the light in the wavelength region corresponding to yellow of visible light than for the light in other wavelength regions, with result that the transmitted light looks blue. Note that, as an alternative to what is described above, a configuration is possible in which the dye or pigment that exhibits blue has, for example, a higher absorptivity (lower transmittance) for light in the wavelength region corresponding to yellow of visible light and for light in the wavelength region corresponding to green, than for light belonging to other wavelength regions, with the result that the transmitted light looks blue. Further, the pigment or dye that exhibits blue arranged with a distribution in the blue colored film 36, such the contained quantity (concentration) gradually and continuously increases as one moves away from the LEDs 122. Accordingly, in the first lens sheet 125b of the present embodiment, the chromaticity correction region 130 has a gradation-form chromaticity distribution in which the chromaticity coordinate values gradually and continuously decrease as one moves away from the LEDs 122. In FIG. 11, the contained quantity (concentration) of the pigment or dye that exhibits blue is indicated by the dot pattern. Note that the details relating to the chromaticity of the chromaticity correction region 130 are the same as in Embodiment 1, and are therefore omitted here to avoid repetition. Further, the above-described configuration is similarly applicable to the second lens sheet.

As described above, according to the present embodiment, an optical sheet 125 includes the transparent base material 34, and first lens sheet (focusing member) 125b formed from at least multiple prisms 35a that are provided on one plate surface (light-exiting surface 34b) of the transparent base material 34 and extend linearly along the one plate surface, and at least a portion of the first lens sheet 125b includes the chromaticity correction region 130. With this configuration, the light emitted from the light-exiting surface of the light guide plate is focused by the multiple prisms 35a provided on the transparent base material 34 when passing through the first lens sheet 125b member included in the optical sheet 125. As a result of the chromaticity correction region 130 included in the first lens sheet 125b, the chromaticity of the transmitted light from the light focusing member is corrected and homogenized, and consequently, color variation in the light emitted from the backlight device is less likely to occur.

Further, the optical sheet 125 has attached thereon the blue colored film 36 that contains a pigment or dye exhibiting a blue color and has a higher contained quantity of the pigment or the dye as one moves away from the LEDs 122 in the chromaticity correction region 130. With this configuration, the light passing through the optical sheet 125 takes on a blue tinge as a result of the pigment or dye that exhibits blue and is contained in the blue colored film 36. Since the contained quantity of the dye or pigment in the chromaticity correction region 130 of the optical sheet 125 increases as one moves away from the LEDs 122, the blue tinge is more easily imparted to the transmitted light of the optical sheet 125 as one moves further away from the LEDs 122. As a result, the chromaticity of the transmitted light from the optical sheet 125 is corrected and homogenized, and consequently, color variation in the light emitted from the backlight device is less likely to occur.

Embodiment 3

Figure 14:
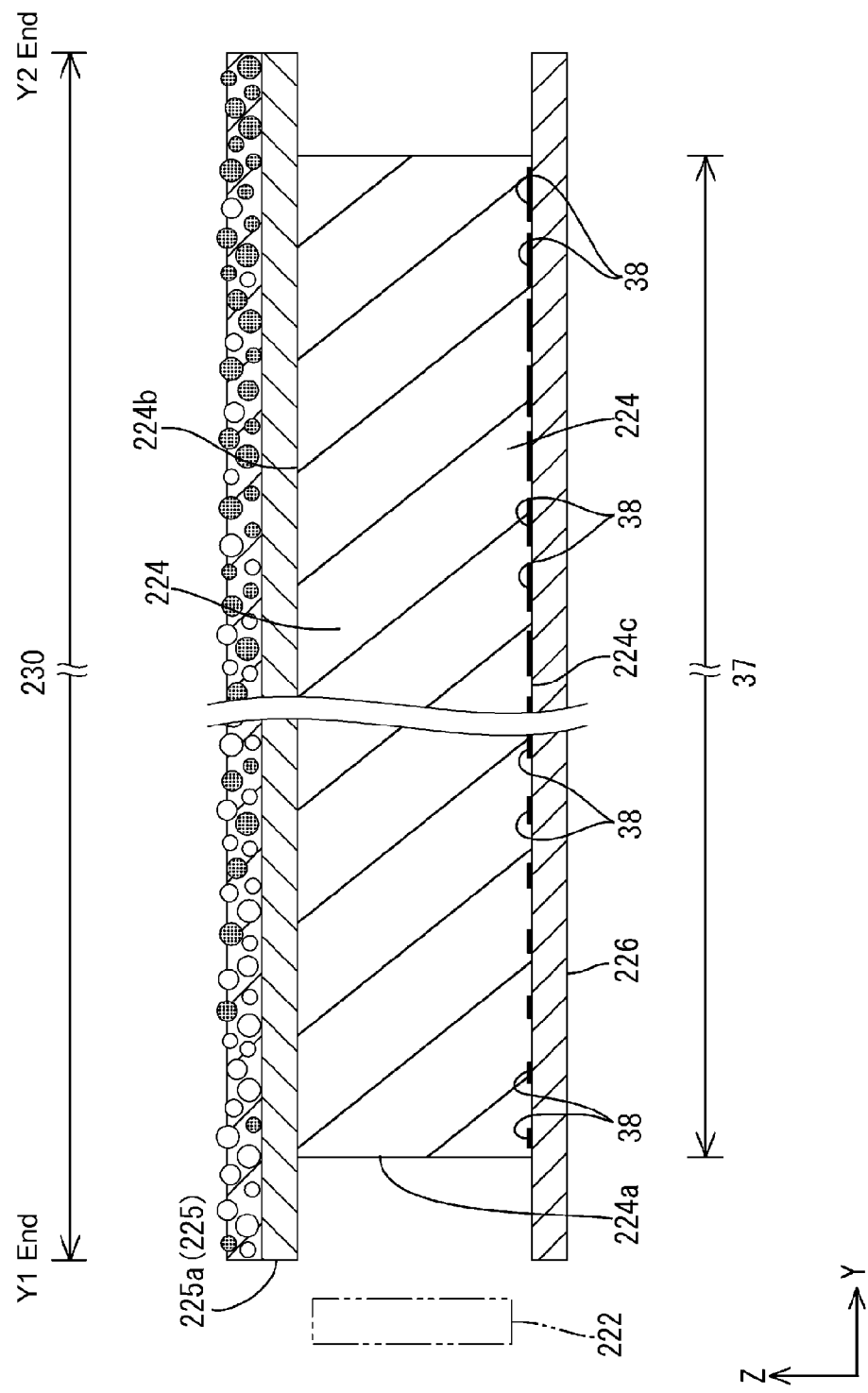
FIG. 14 is a cross-sectional view of a reflective sheet, light guide plate and an optical sheet taken along a long-side direction (Y-axis direction).

Embodiment 3 of the present invention will be explained below with reference to FIGS. 12 to 14. In Embodiment 3, a configuration in which a reflective sheet 226 includes a second chromaticity correction region 37 is described. Note that repetitious description of structures, operations and effects similar to those of the above-described Embodiment 1 have been omitted.

Figure 12:
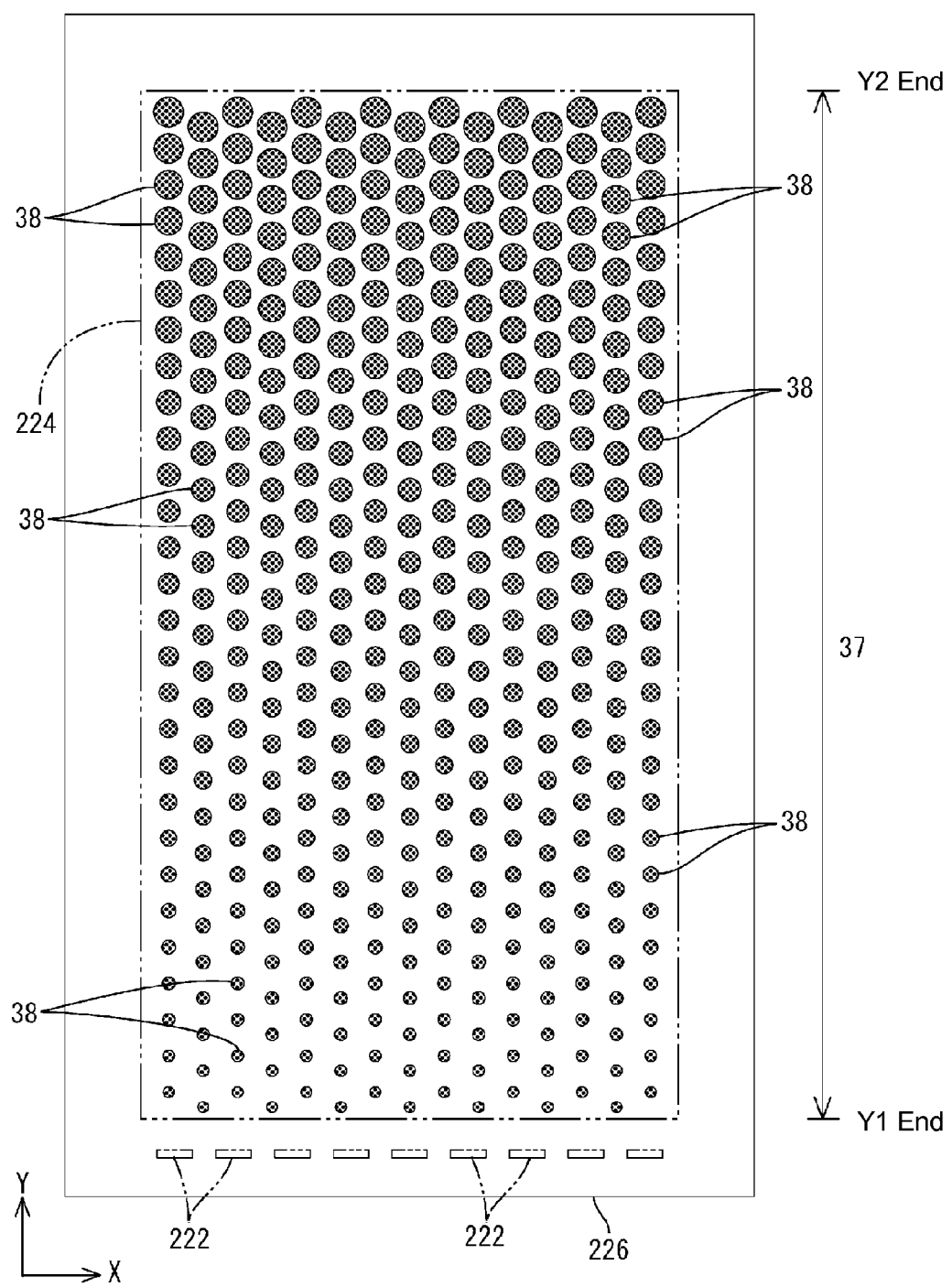
FIG. 12 is a plan view of a reflective sheet according to Embodiment 3 of the present invention.

As illustrated in FIGS. 12 and 13 a multitude of dots 38 formed from a coating material that exhibits blue are provided on the reflective sheet 226 of the present embodiment, the dots 38 being provided on a surface that faces a front side and opposes a light guide plate 224. When lights hits the portion of the reflective sheet 226 coated with the dots 38, the reflected light takes on a blue tinge. The dots 38 are arranged to gradually increase in area as one moves away from LEDs 222 and, conversely, to gradually reduce in area as one moves towards the LEDs 222. Hence, the light reflected by the reflective sheet 226 has a chromaticity distribution whereby the chromaticity becomes increasingly blue as one moves away from the LEDs 222. Conversely as one nears the LEDs 222, the chromaticity becomes less blue, tending toward white (chromaticity coordinate values x0, y0). Accordingly, the reflective sheet 226 includes a second chromaticity correction region 37 for which the chromaticity coordinate values of the reflected light gradually decrease as one moves away from the LEDs 222. The second chromaticity correction region 37 is provided in a range covering substantially the entire area of the reflective sheet 226 overlapping the light guide plate 224 when seen in plan view. Note that in FIG. 12, the LEDs 22 are schematically depicted using a chain double-dashed line to depict the LEDs 222 and the light guide plate 224. As illustrated in FIG. 14, the reflective sheet 226 of the above configuration can correct to an even more preferable level the chromaticity of the light emitted from the backlight device 213 through the combined action of the reflective sheet 226 of the above-described configuration and the diffusion sheet 225a described in Embodiment 1. Note that the chromaticity of the second chromaticity correction region 37 is similar to that of the chromaticity correction region 230 of the diffusion sheet 225a described in Embodiment 1 above (see FIGS. 9 and 10), and so further detailed description is omitted here. Further, in FIG. 14, the LEDs 222 are schematically depicted using a chain double-dashed line. Besides the ways described above, other possible ways of adjusting the actual chromaticity of the reflective sheet 226 include setting the area of the dots 38 of coating material to be the same size while varying the spacing between the dots 38.

According to the above-described present embodiment, a reflective sheet (reflecting member) 226 arranged to be in contact with a plate surface 224c of the light guide plate 224 on an opposite side to the light-exiting surface 224b is provided, and at least a portion of the reflective sheet 226 includes a second chromaticity correction region 37 in which an x value and a y value that are chromaticity coordinate values in a CIE 1931 color space decrease as one moves away from the LEDs 222. With this arrangement, when light is incident on the light-receiving face 224a of light guide plate 224 from the LEDs 222, the light is, in the process of propagating within the light guide plate 224, reflected towards the light-exiting surface 224b by the reflective sheet 226 that is arranged to be in contact with the plate surface 224c on the opposite side to the light-exiting surface 224b, and is thereby emitted from the light-exiting surface 224b. For the light propagating within the light guide plate 224, the propagation of longer wavelength light is suppressed to a greater extent by the second chromaticity correction region 37 included in at least a part of the reflective sheet 226 as one moves further away from the LEDs 222. Thus, the chromaticity of the emitted light from the light guide plate 224 is corrected and, consequently, in combination with the chromaticity correction region 230 included in the optical sheet 225, this arrangement makes it less likely that color variation will occur in the light emitted from the backlight device.

Further, the multitude of dots 38 forming the coating material are provided on the surface in the second chromaticity correction region 37 of the reflective sheet 226. Thus, the mode (area, distribution density and the like) of the dots 38 formed by the coating material of the prescribed color allows the chromaticity of the second chromaticity correction region 37 to be controlled in a simple manner.

Embodiment 4

Embodiment 4 of the present invention will be explained below with reference to FIG. 15. In Embodiment 4, a configuration is described in which a configuration of a liquid crystal panel 311 is modified. Note that repetitious description of structures, operations and effects similar to those of the above-described Embodiment 1 have been omitted.

Figure 15:
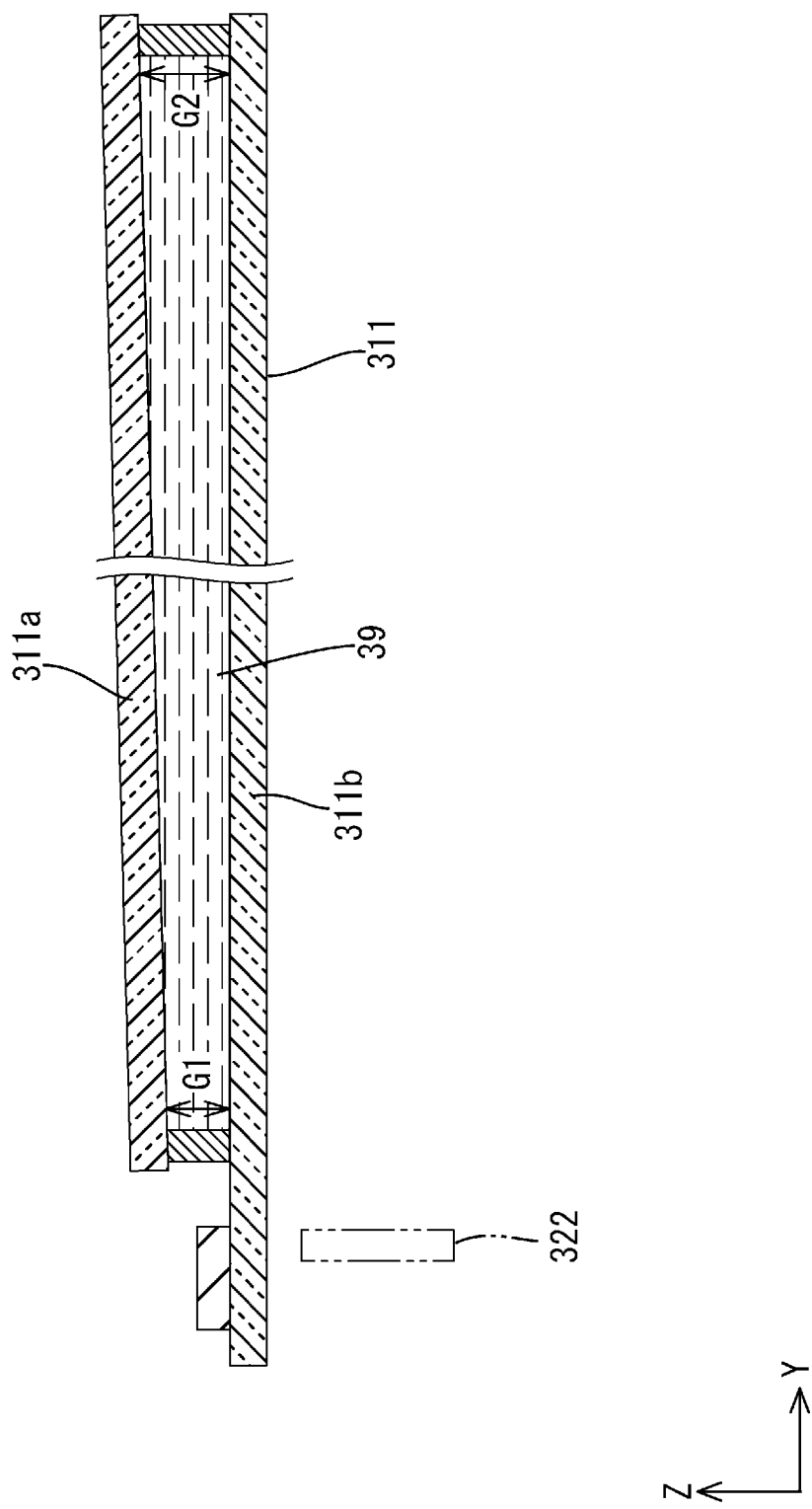
FIG. 15 is a cross-sectional view of a liquid crystal panel according to Embodiment 4 of the present invention, taken along a long-side direction (Y-axis direction).

As illustrated in FIG. 15, the liquid crystal panel 311 of the present embodiment a gap between the pair of substrates 311a and 311b, which is to say a thickness (cell gap) of a liquid crystal layer 39 sandwiched between the two substrates 311a and 311b, is non-uniform. Specifically, the gap between the pair of substrates 311a and 311b gradually widens as one moves away from LEDs 322. If the above-described gap is denoted G1 at the end of the liquid crystal panel 311 at the side of the LEDs 322 and G2 at the end of the liquid crystal panel at the opposite side to the side of the LEDs 322, then G2 is larger than G1. Here, the chromaticity of the transmitted light from the liquid crystal panel 311 fluctuates according to the gap between the pair of substrates 311a and 311b. Specifically, as the gap widens, the chromaticity of the transmitted light tends takes on an increasingly yellow tinge. Thus, the above-described configuration in which the gap between the pair of substrates 311a and 311b widens as one moves away from the light source, it might be expected that the transmitted light from the liquid crystal panel 311 would be subject to color variation due to yellowing as one moves away from the LEDs 322, in a similar manner to the light emitted from the light guide plate not shown in the drawings. However, the occurrence of color variation in the transmitted light from the liquid crystal panel 311 can be appropriately mitigated through the inclusion of the chromaticity correction region in the diffusion sheet (not shown in the drawings) described in Embodiment 1 above. Further, in FIG. 15, the LEDs 322 are schematically illustrated using a chain double-dashed line to indicate the position of the LEDs 322 relative to the liquid crystal panel 311.

As described above, in present embodiment, the liquid crystal panel 311 may be configured so that the gap G1, G2 between the pair of substrates 311a and 311b widens as one moves away from the LEDs 322. The chromaticity of the transmitted light from the liquid crystal panel 311 may fluctuate according to the gap (cell gap) between the pair of substrates 311a and 311b. For example, when the gap widens, there is a tendency for the chromaticity of the transmitted light take on a yellow tinge. Hence, as described above, in a configuration in which the gap G1, G2 between the pair of substrates 311a and 311b widens as one moves away from the LEDs 322, though it might be expected that the transmitted light from the liquid crystal panel 311 will be subject to color variation due to yellowing as one moves away from the LEDs 322, by providing the chromaticity correction region in the optical sheet that forms part of the backlight device, it is possible to appropriately mitigate the color variation occurring in the transmitted light from the liquid crystal panel 311.

Embodiment 5

Embodiment 5 of the present invention will be explained below with reference to FIGS. 16 to 18. In Embodiment 5, a formation range of a chromaticity correction region 430 of a diffusion sheet 425a is modified. Note that repetitious description of structures, operations and effects similar to those of the above-described Embodiment 1 have been omitted.

Figure 16:
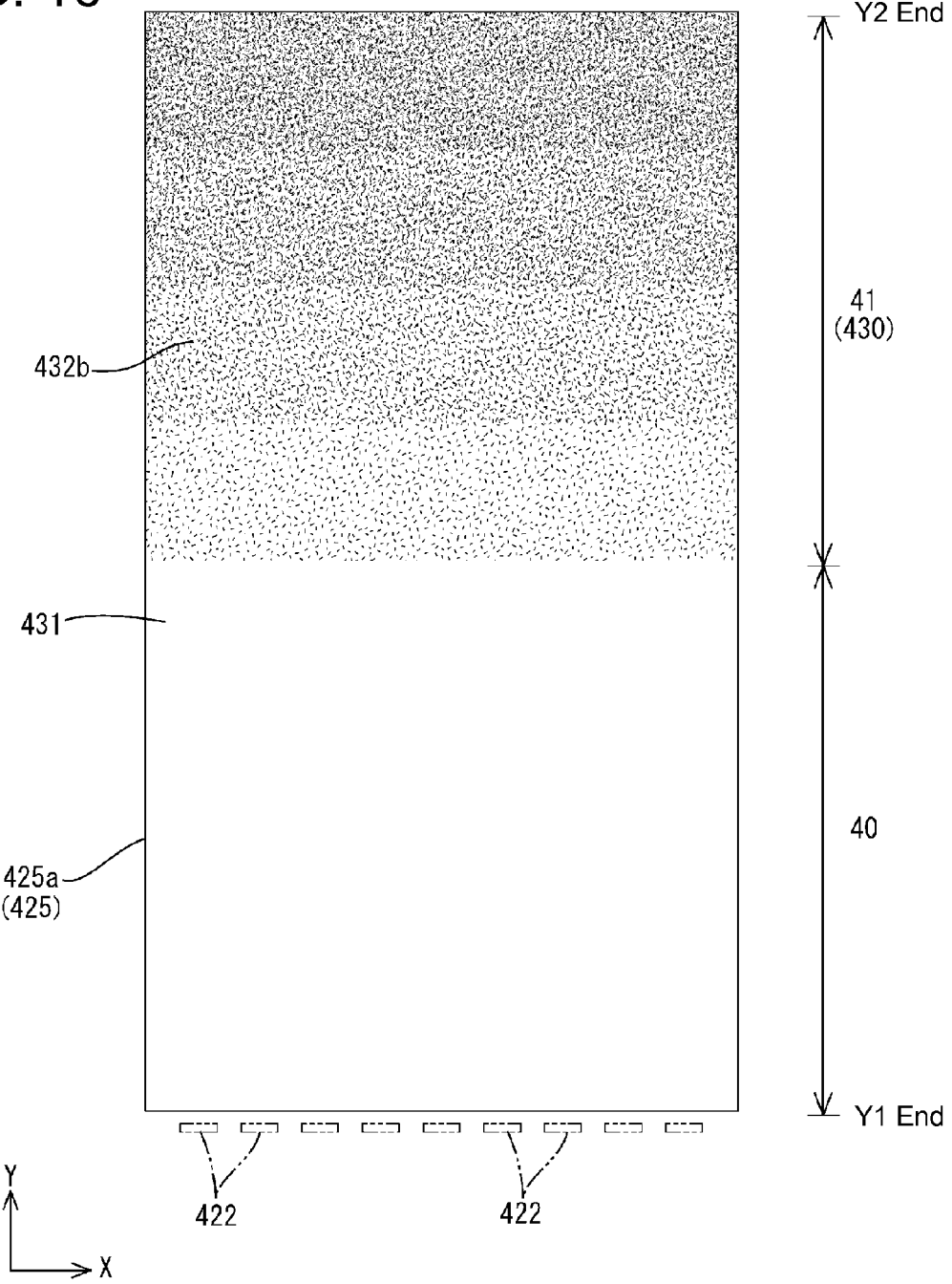
FIG. 16 is a plan view of a diffusion sheet according to Embodiment 5 of the present invention.
Figure 17:
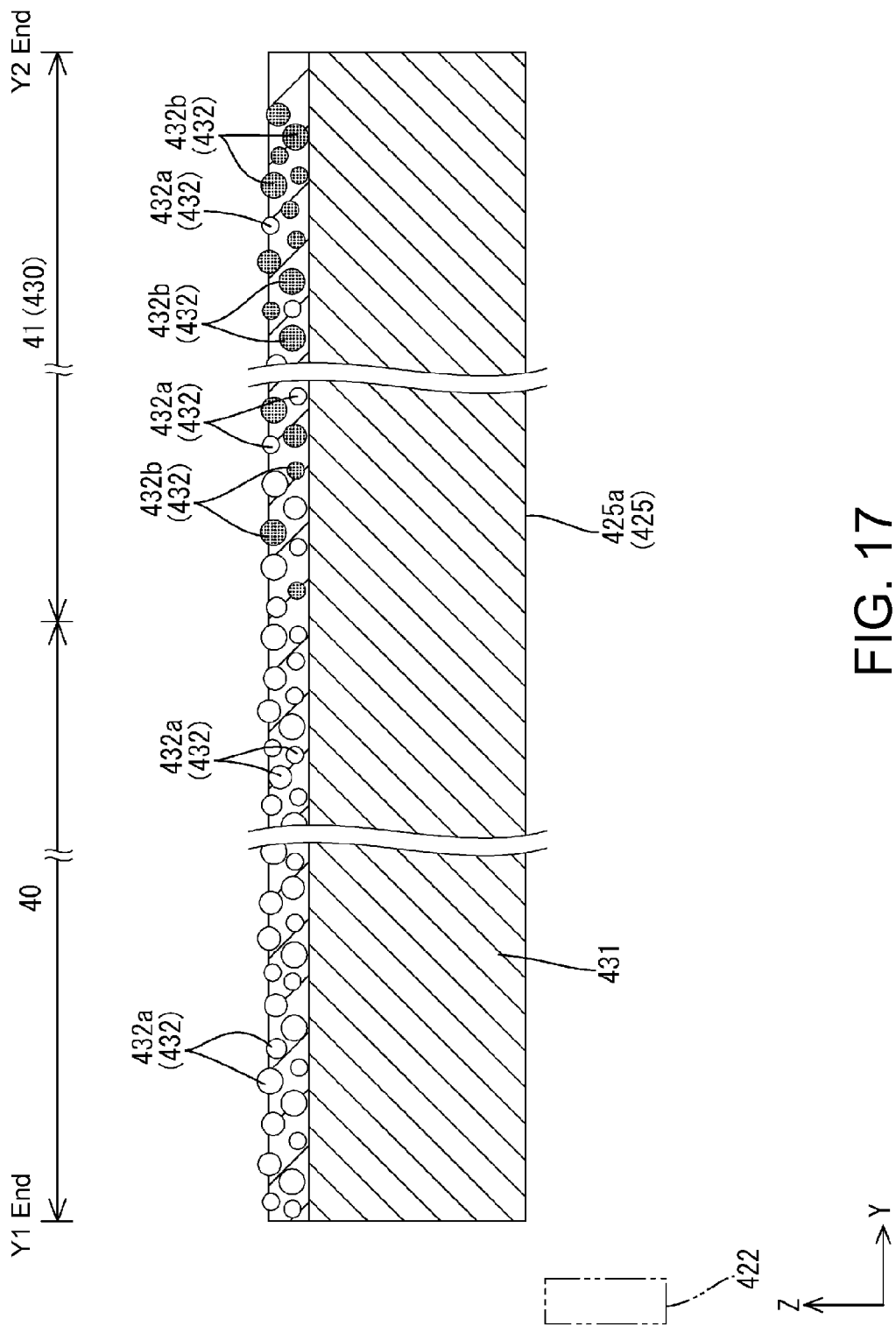
FIG. 17 is a cross-sectional view of the diffusion sheet taken along a long-side direction (Y-axis direction).

If, as illustrated in FIG. 16, the diffusion sheet 425a of the present embodiment is divided into a first region 40 relatively close to the LEDs 422 and a second region 41 relatively far from the LEDs 422, the second region 41 alone is set as the chromaticity correction region 430. The diffusion sheet 425a is substantially equally divided so that the first region 40 and the second region 41 are of substantially the same area. The following is a description of the multitude of light diffusing particles 432 distributed on a transparent base material 431. As illustrated in FIG. 17, in the first region 40 of the diffusion sheet 425a, no blue-colored light diffusing particles 432b are provided—only colorless light diffusing particles 432a are provided. By contrast in the second region 41, colorless light diffusing particles 432a and blue-colored light diffusing particles 432b are mixed, with the mixed proportions (distribution density) varying along the Y-axis direction with distance from the LEDs 422. Specifically, in the second region 41, the mixed proportion (distribution density) of the blue-colored light diffusing particles 432b is increased as distance from the LEDs 422 increases, and the mixed proportion (distribution density) of the colorless light diffusing particles 432a is reduced as distance from the LEDs 422 increases. Thus, while the transmitted light from the first region 40 of the diffusion sheet 425a has no specific color tinge, transmitted light from the second region 41 has a tinge of blue, with the blue tinge becoming progressively darker as one moves away from the LEDs 422. Hence, the above-described portion (second region 41) of the diffusion sheet 425a is the chromaticity correction region 430. Note that in FIGS. 16 and 17, the LEDs 422 are schematically depicted using a chain double-dashed line.

Figure 18:
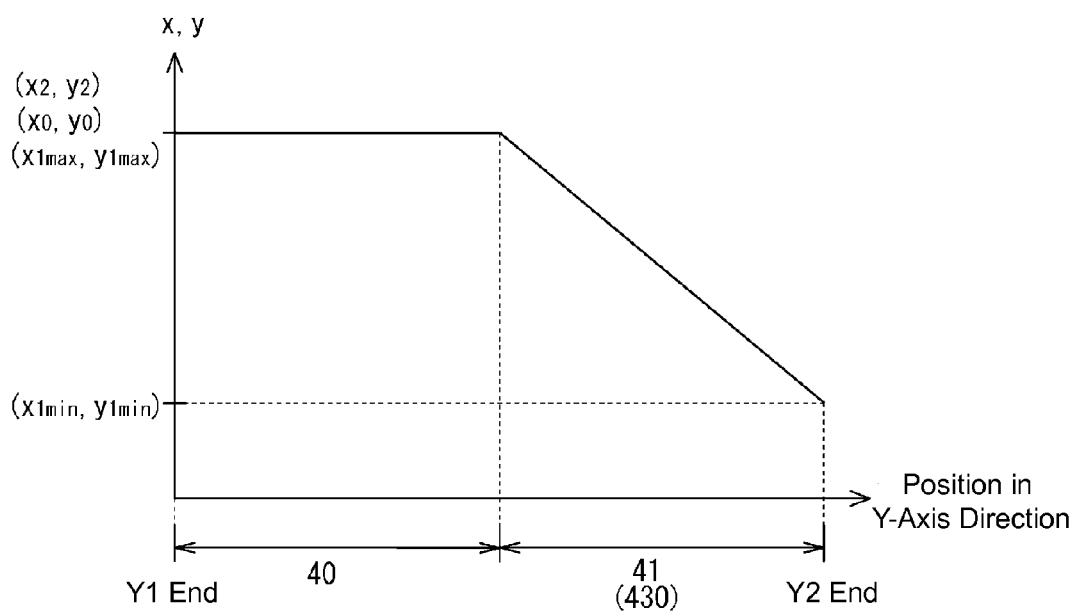
FIG. 18 is a graph showing a change in the chromaticity coordinate values going from a Y1 end to a Y2 end of the diffusion sheet.

The chromaticity coordinate values (x2, y2) in the CIE 1931 color space of the first region 40 are, as illustrated in FIG. 18 substantially equal to the chromaticity coordinate values of the white reference chromaticity (x0, y0). Hence, in the first region 40, the chromaticity coordinate values (x2, y2) are substantially equal to the maximum values (x1max, y1max) but larger than the minimum values (x1min, y1min) of the chromaticity coordinate values (x1, y1) of the chromaticity correction region 430 (second region 41). In addition, the chromaticity coordinate values (x2, y2) of the first region 40 are substantially constant over the entire region. The above-described x values of the chromaticity coordinate values (x1min, x1max, x0 and x2) have a relative magnitude that satisfies Formula (3) below and the chromaticity coordinate values (y1min, y1max, y0 and y2) have a relative magnitude that satisfies Formula (4) below. Note also that the "white reference chromaticity" described here is the same as that in the above-described Embodiment 1. The chromaticity coordinate values in the first region 40 and the second region 41 are obtained by illuminating the diffusion sheet 425a with light emitted from the LEDs 422, and measuring the transmitted light using a colorimeter or the like.

[Formula 3]

$$x1\mathrm{min} < x1\mathrm{max} = x0 = x2 \quad (3)$$

[Formula 4]

$$y1\mathrm{min} < y1\mathrm{max} = y0 = y2 \quad (4)$$

As described above, according to the present embodiment, the optical sheet 425 diffusion sheet 425a of the present embodiment is divided into a first region 40 relatively close to the LEDs 422 and a second region 41 relatively far from the LEDs 422, with the second region 41 alone being set as the chromaticity correction region 430. If the chromaticity coordinate values of the CIE 1931 color space of the chromaticity correction region 430 are denoted (x1, y1) and the chromaticity coordinate values of the CIE 1931 color space of the first region 40 are denoted (x2, y2), the configuration is such that x2 of the first region 40 will be substantially equal to the maximum value of x1, y2 will be substantially equal to the maximum value of y1, and x2 and y2 will each be fixed values. For instance, in the case that the emitted light from the light-exiting surface of the light guide plate has no specific color at positions up to certain distance from the LEDs 422, the second region 41 that is relatively distant from the LEDs 422 on the optical sheet 425 is set as the chromaticity correction region 430 as described above, and, in the first region 40 that is relatively close to the LEDs 422, the chromaticity coordinate values x2 and y2 are set to be constant and substantially equal to the maximum values of the x1 and y1 of the chromaticity correction region. Thus, when the light has a specific color tinge, the light can be passed through the chromaticity correction region 430 to appropriately correct chromaticity, and when there is substantially no specific color, the light can be passed through the first region 40 for which the chromaticity is substantially constant. Thus, the chromaticity of the transmitted light of the optical sheet 425 can be appropriately corrected.

Further, where the chromaticity coordinate values of the CIE 1931 color space for the white reference chromaticity are denoted (x0, y0), the optical sheet 425 is configured so that at least x2 and y2 in the first region 40 are substantially equal to x0 and y0, respectively. For example, when the light from the LEDs 422 is white, the process of propagation within the light guide plate results in light with substantially no specific color being passed through the first region 40 of the optical sheet 425, and the transmitted light is therefore homogenous white light. Hence, color variation can be suppressed in an even more favorable way.

Embodiment 6

Embodiment 6 of the present invention will be explained below with reference to FIG. 19. In Embodiment 6, an arrangement is described in which a diffusion sheet 525a includes a blue colored film 536. Note that repetitious description of structures, operations and effects similar to those of the above-described Embodiments 1 and 2 have been omitted.

Figure 19:
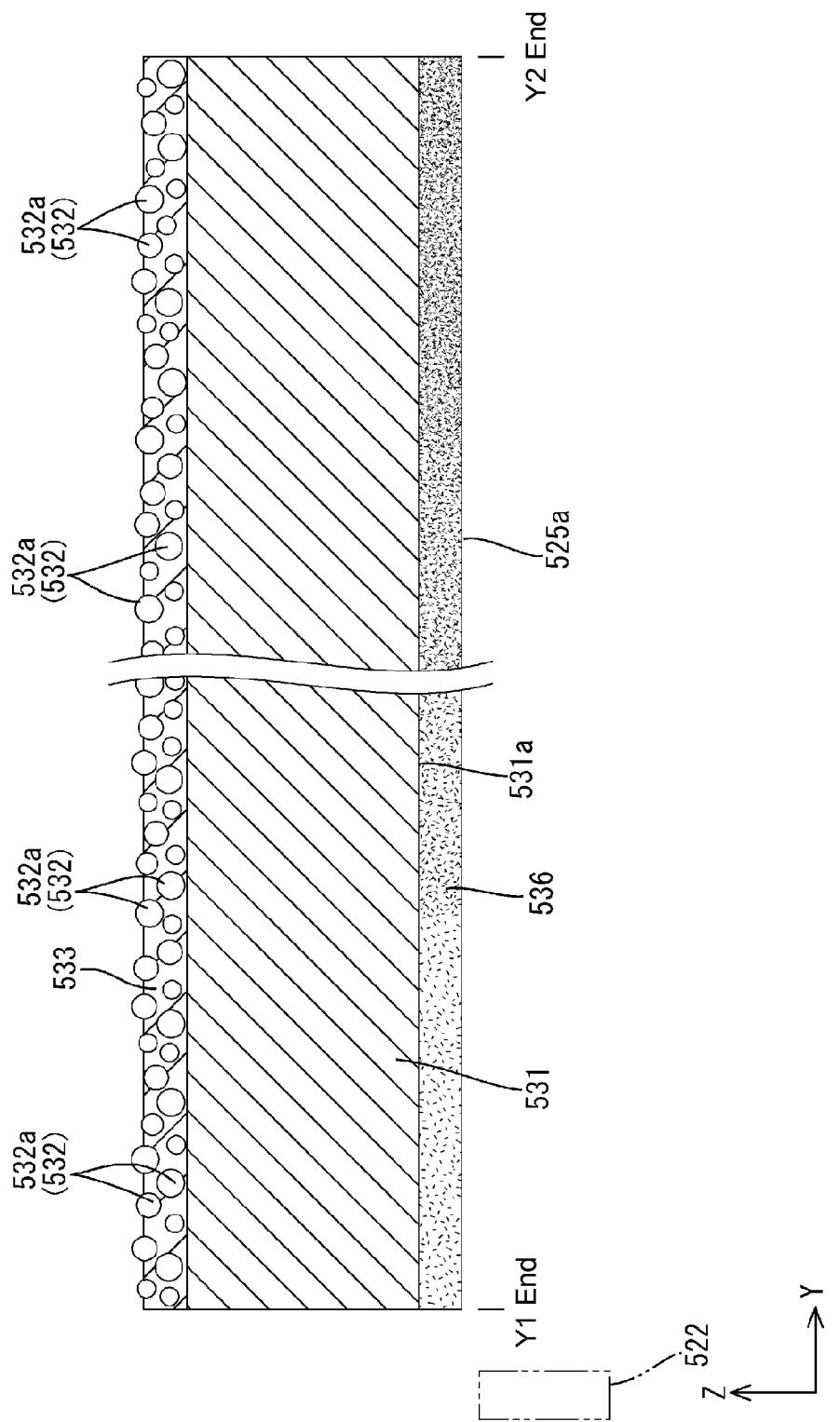
FIG. 19 is a cross-sectional view of a diffusion sheet according to Embodiment 6 of the present invention, taken along a long-side direction (Y-axis direction).

As illustrated in FIG. 19, the diffusion sheet 525a of the present embodiment has attached thereto in the form of layers the blue colored film 536 on an incident surface 531a of the transparent base material 531. The configuration of the blue colored film 536 is similar to that described in Embodiment and is formed of a pigment or a die that is dispersed, and the pigment or die is compounded with a distribution such that the amount of blue pigments or die gradually increases as the blue colored film 536 is farther away from the LED 522. As a result of the blue colored film 536, the chromaticity of transmitted light from the diffusion sheet 525a can be arranged in a distribution in which the blue tinge grows stronger as one moves away from the LEDs 522. Meanwhile, light diffusing particles 532 are all colorless light diffusing particles 532a, and are distributed with a particular distribution density within a surface of the diffusion sheet 525a. In other words, only one type of the light diffusion particles 532 is needed, and thus the light diffusion particles 532 can be distributed with ease during the manufacturing of the diffusion sheet 535a.

Embodiment 7

Embodiment 7 of the present invention will be explained below with reference to FIG. 20. In Embodiment 7, an arrangement is described in which the dots 638 formed from a blue coating material are formed on a diffusion sheet 625a Note that repetitious description of structures, operations and effects similar to those of the above-described Embodiments 1 and 3 have been omitted.

Figure 20:
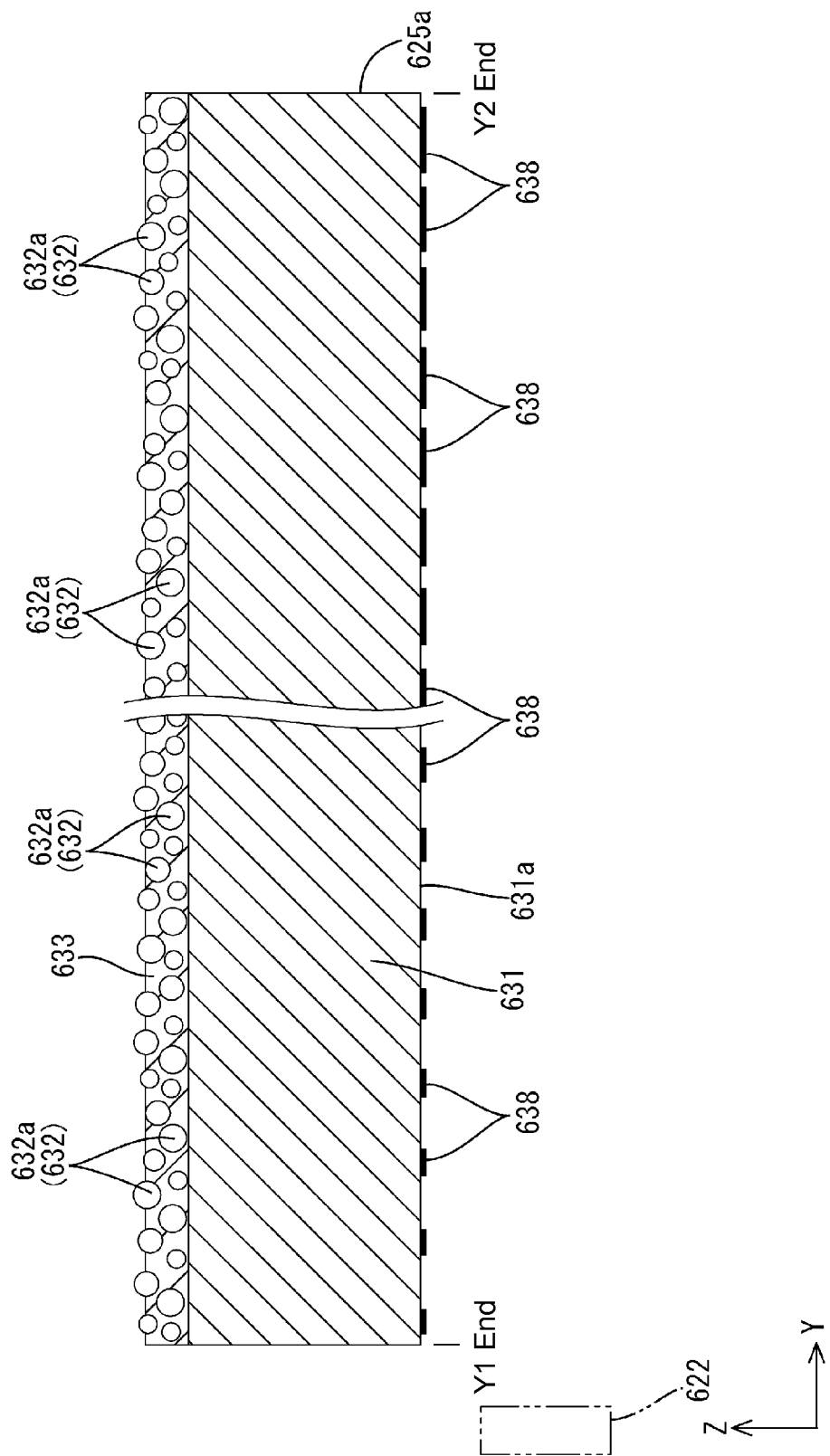
FIG. 20 is a cross-sectional view of a diffusion sheet according to Embodiment 7 of the present invention, taken along a long-side direction (Y-axis direction).

As shown in FIG. 20, the diffusion sheet 625a according to the present embodiment has a plurality of dots 638a made of a blue coating on a light-receiving side surface 631a of a transparent base member 531 (light diffusion particles 632 and a surface on a side opposite bonding layer 633 side). In the present embodiment, the dots 638 are similar to those described in Embodiment 3, and the area thereof gradually increases as the dots 638 is farther away from the LED 622, and if the dots 638 move closer to the LED 622, then the area of the dots 638 gradually decreases. Due to the dots 638 made of blue coating, the chromaticity of the transparent light of the diffusion sheet 625a can have a chromaticity distribution in which the bluish tone increases in a direction heading away from the LED 622. Meanwhile, the light diffusion particles 632 are all colorless light diffusion particles 632a, and are distributed within a surface of the diffusion sheet 625a with a particular distribution density. In other words, only one type of light diffusion particles 632 is needed, and thus the light diffusion particles 632 can be distribute with ease.

Embodiment 8

Embodiment 8 of the present invention is explained below with reference to FIG. 21. Embodiment 8 is a type of modification example of Embodiment 2 having the blue colored film removed and having a lens film 735 that is a part of a first lens sheet 725b colored. Note that repetitious description of structures, operations and effects similar to those of the above-described Embodiments 1 and 2 have been omitted.

Figure 21:
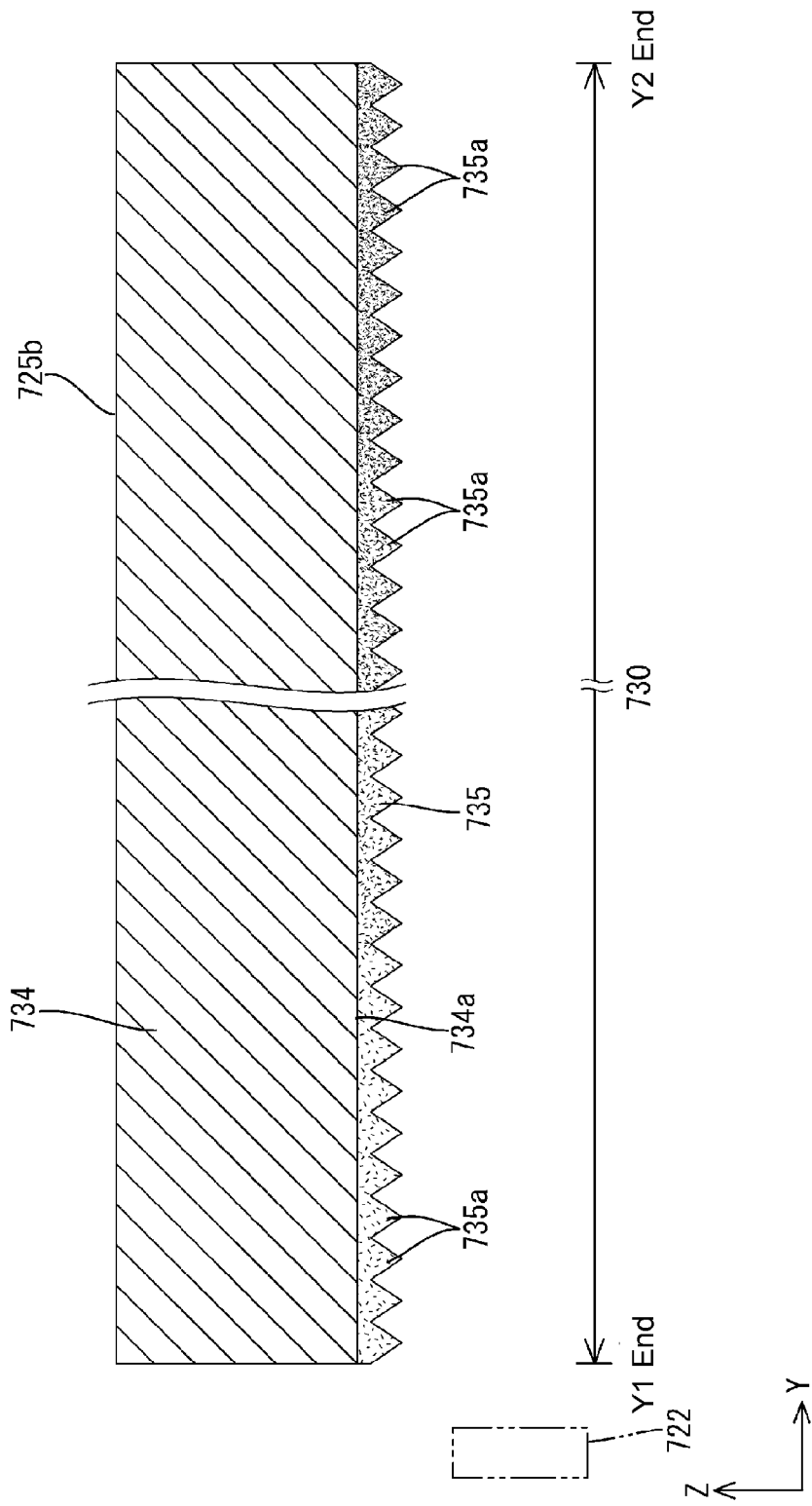
FIG. 21 is a cross-sectional view of a lens sheet according to Embodiment 8 of the present invention, taken along a long-side direction (Y-axis direction).

As shown in FIG. 21, the first lens sheet 725 according to the present embodiment has a lens film 735 stacked on the light-receiving surface 734a of the transparent base material 734. The lens film 735, in a similar manner to the configuration described in Embodiment 2, has a large number of prisms 735a formed thereon. In addition, the lens film 735 also has pigments or dyes exhibiting a similar blue color to that in Embodiment 2 dispersed thereon. Specifically, the lens film 735 has pigments or dyes exhibiting a blue color dispersed in a resin material that is substantially transparent with excellent light transmissive characteristics, and the concentration of the pigments or dyes exhibiting this blue color becomes consecutively and gradually greater further from the LEDs 722. This lens film 735 enables a chromaticity distribution in which the chromaticity of light that has passed through the first lens sheet 725 develops an increasingly blue tinge further away from the LEDs 722. Due to this, the first lens sheet 725b of the present embodiment has a chromaticity correction region 730 having a gradated chromaticity distribution in which the chromaticity coordinates thereof both become gradually smaller further away from the LEDs 722. In FIG. 21, the concentration of the pigments or dyes exhibiting a blue color is shown by the dotted pattern. The specific chromaticity of the chromaticity correction region 730 is similar to Embodiment 1 described above, and thus an explanation thereof will not be repeated. Further, the above-described configuration is similarly applicable to the second lens sheet.

Embodiment 9

Embodiment 9 of the present invention is explained below with reference to FIG. 22. Embodiment 9 is a modification example of Embodiment 3, and has a configuration in which the dots are omitted and a blue-colored film 836 is attached to a reflective sheet 826. Descriptions of structures, operations, and effects similar to those of Embodiments 1 to 3 will be omitted.

Figure 22:
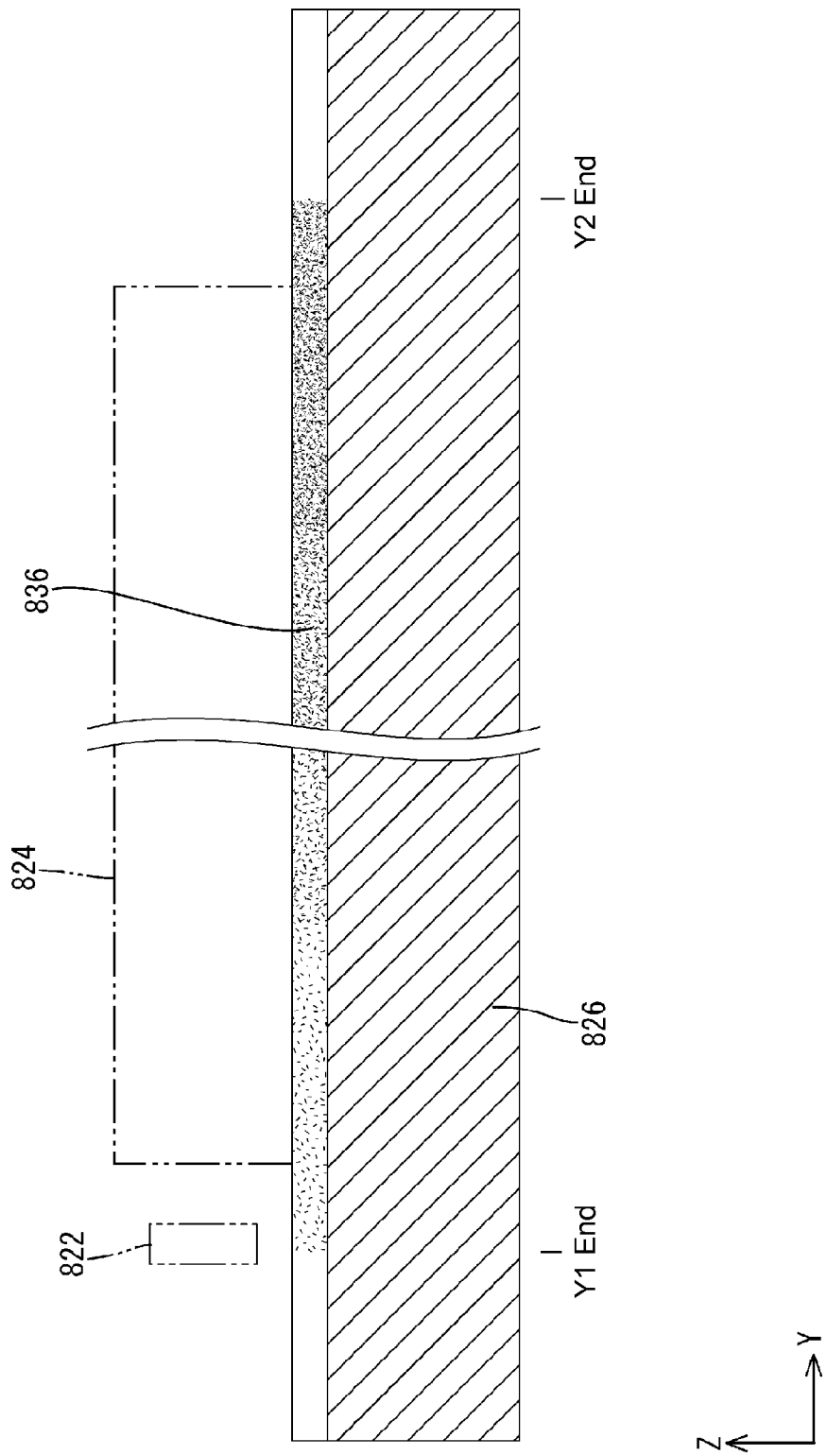
FIG. 22 is a cross-sectional view of a reflective sheet according to Embodiment 9 of the present invention, taken along a long-side direction (Y-axis direction).

As shown in FIG. 22, the reflective sheet 826 of the present embodiment has a blue-colored film 836 stacked on the surface of the reflective sheet 826 facing the light guide plate 824. The configuration of the blue-colored film 836 is similar to the configuration described in Embodiment 2, and includes pigments or dyes exhibiting a blue color dispersed in a substantially transparent resin material with excellent light transmission characteristics. The pigments or dyes exhibiting a blue color are dispersed such that a distribution thereof becomes gradually greater further away from the LEDs 822. The blue-colored film 836 can cause the chromaticity of the reflected light from the reflective sheet 826 to develop an increasingly blue tinge further away from the LEDs 822.

Embodiment 10

Embodiment 10 of the present invention will be explained below with reference to FIG. 23. In Embodiment 10, an arrangement is described in which the chromaticity of the chromaticity correction region is modified. Note that repetitious description of structures, operations and effects similar to those of the above-described Embodiment 1 have been omitted.

Figure 23:
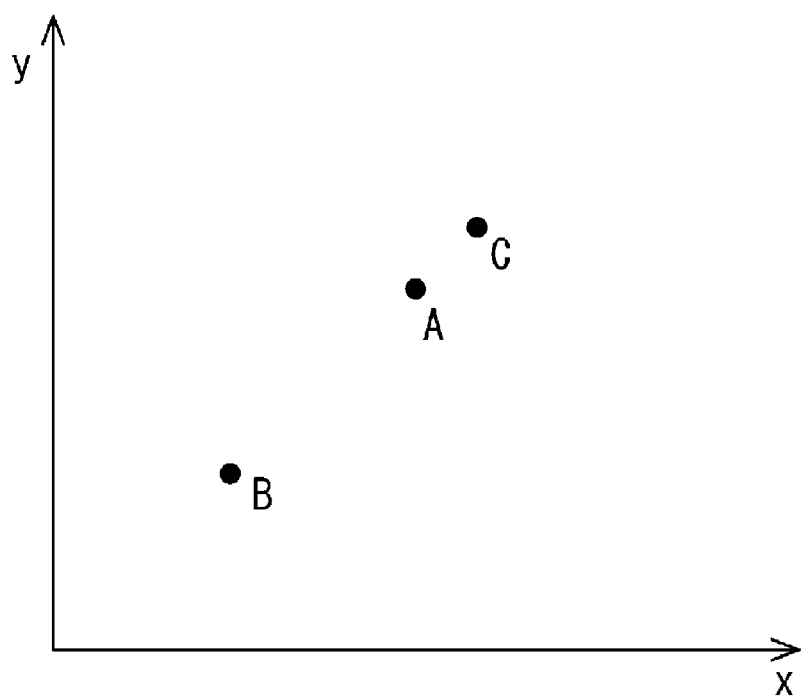
FIG. 23 is an enlarged view of a main portion in the CIE 1931 color space represented by chromaticity coordinate values of the diffusion sheet of Embodiment 10 according to the present invention.

Shown in FIG. 23, point A (x1max, y1max) representing the maximum value of the chromaticity coordinates in the chromaticity of the chromaticity correction region (not shown) in the present invention has relatively smaller values than point C (x0, y0) representing the chromaticity coordinates of the white color reference chromaticity. In other words, a greater number of blue-colored light diffusing particles are dispersed on the LED end of the diffusion sheet than in Embodiment 1, and this causes the light passing through this end to develop a lightly blue tinge. Accordingly, the respective x coordinates (x1min, x1max, x0) in point A (x1max, y1max) representing the maximum value of the chromaticity coordinates in the chromaticity correction region, point B (x1min, y1min) representing the smallest value of the same, and point C (x0, y0) representing the white color reference chromaticity are in a magnitude relationship that satisfies formula (5) below, and the respective y values (y1min, y1max, y0) are in a magnitude relationship that satisfies formula (6) below.

[Formula 5]

$$x1\text{min} < x1\text{max} < x0 \quad (5)$$

[Formula 6]

$$y1\text{min} < y1\text{max} < y0 \quad (6)$$

Embodiment 11

Embodiment 11 of the present invention will be explained below with reference to FIGs. Embodiment 11 is another modification example of Embodiment 5, in which the chromaticity distribution of a chromaticity correction region 1030 on a diffusion sheet 1025a has been modified. Descriptions of structures, operations, and effects similar to those of Embodiments 1 and 5 will be omitted.

Figure 24:
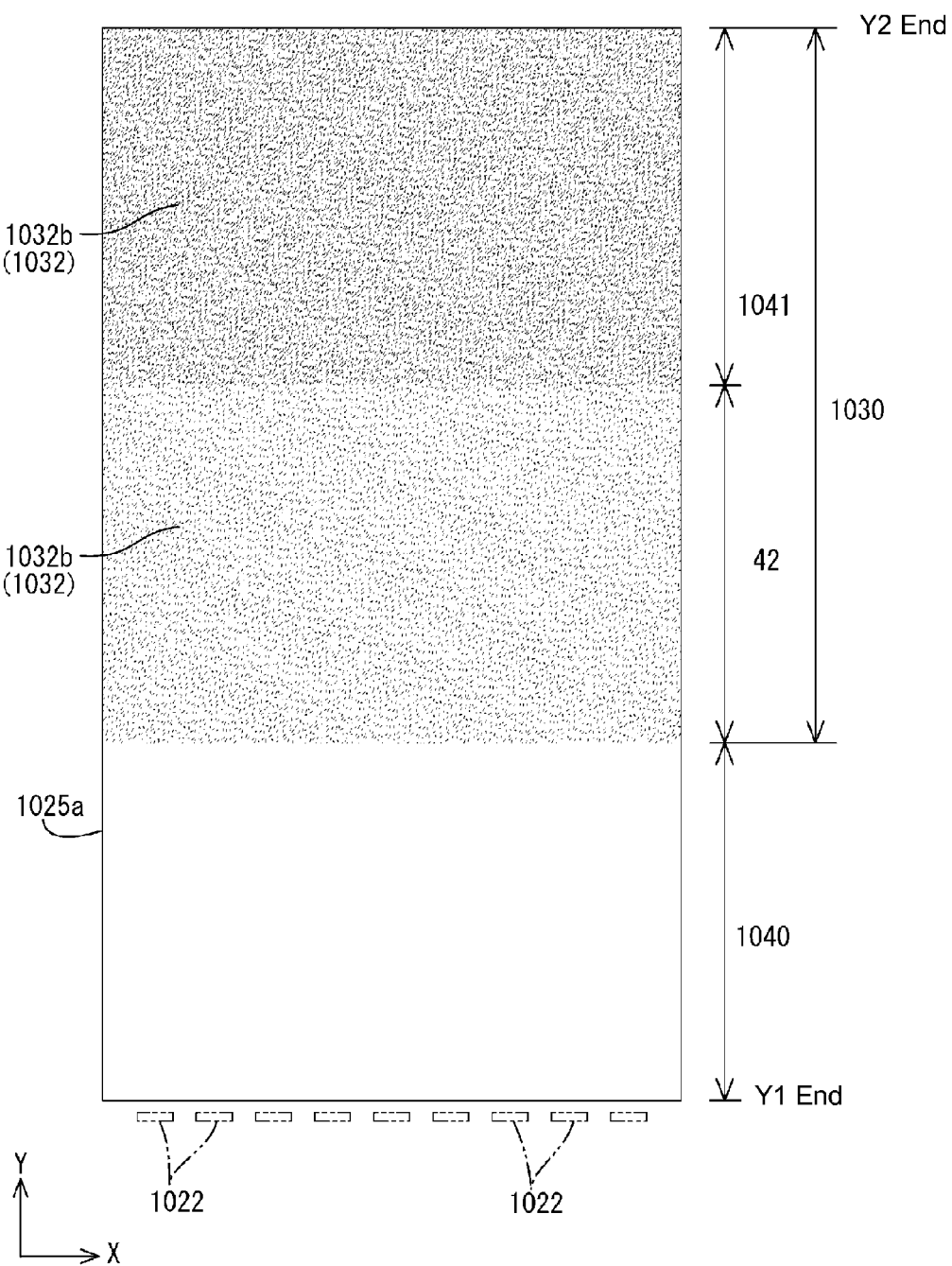
FIG. 24 is a plan view of a diffusion sheet according to Embodiment 11 of the present invention.

As shown in FIG. 24, when the diffusion sheet 1025a of the present embodiment is demarcated into a first region 1040 closest to the LEDs 1022, a second region 1041 furthest from the LEDs 1022, and a third region 42 interposed between the first region 1040 and the second region 1041 and adjacent to both, the second region 1041 and the third region 42 except for the first region 1040 serve as the chromaticity correction region 1030. The first region 1040, the second region 1041, and the third region 42 of the diffusion sheet 1025a have substantially the same area and are substantially uniformly demarcated. Accordingly, ⅔rds (at least half) of the diffusion sheet 1025a is the chromaticity correction region 1030. The first region 1040 on the diffusion sheet 1025a only has colorless diffusion particles (not shown) as light diffusing particles 1032, whereas the second region 1041 and the third region 42 have a mix of colorless light diffusion particles and blue-colored light diffusing particles 1032b.

Figure 25:
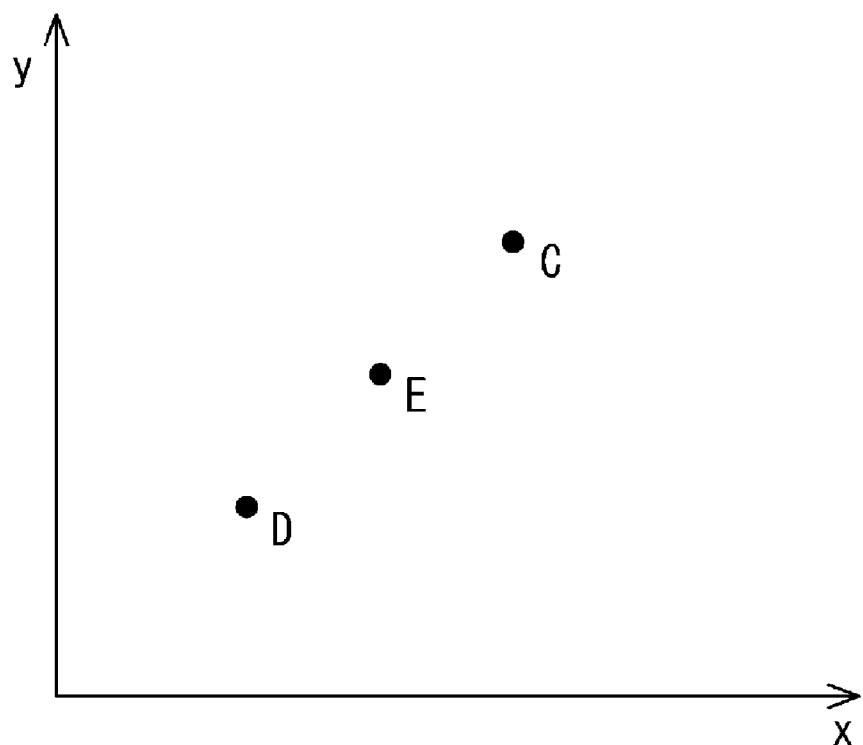
FIG. 25 is an enlarged view of a main portion in the CIE 1931 color space represented by chromaticity coordinate values of the diffusion sheet.
Figure 26:
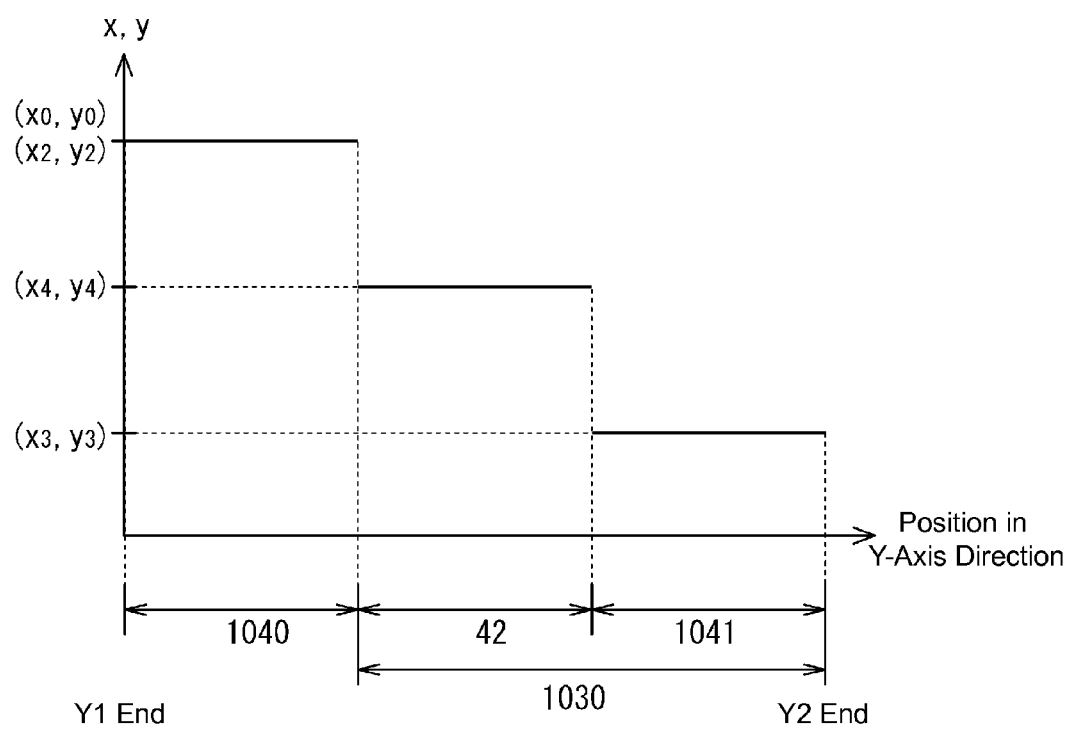
FIG. 26 is a graph showing a change in the chromaticity coordinate values going from a Y1 end to a Y2 end of the diffusion sheet.

As shown in FIGS. 25 and 26, the mixing ratio (distribution density) of the blue-colored light diffusing particles 1032b on the third region 42 is relatively less than the mixing ratio (distribution density) of the blue-colored light diffusing particles 1032b in the second region 1041, and this distribution density is approximately uniform from the end near the first region 1040 (near the LEDs 1022) to the end near the second region 1041. The mixing ratio (distribution density) of the blue-colored light diffusing particles 1032b in the second region 1041 is slightly larger than the mixing ratio (distribution density) of the blue-colored light diffusing particles 1032b in the third region 42, and this distribution density is approximately uniform from the end near the second region 1041 to the end opposite thereto. When point C (x2, y2) is the chromaticity coordinates of the chromaticity in the CIE 1931 color map for the first region 1040, point D (x3, y3) is the chromaticity coordinates of the chromaticity for the second region 1041, and point E (x4, y4) is the chromaticity coordinates of the chromaticity for the third region 42, then the values of point C (x2, y2), point E (x4, y4), and point D (x3, y3) become stepwise smaller in this stated order. In other words, the x and y values that are the chromaticity coordinates of the chromaticity for this diffusion sheet 1025a both become stepwisely and consecutively smaller in three steps further away from the LEDs 1022. Furthermore, the chromaticity coordinates (x2, y2) of the first region 1040 are approximately equal to the chromaticity coordinates (x0, y0) of the white color reference chromaticity. The respective x values (x0, x2, x3, and x4) of the chromaticity coordinates described above are in a magnitude relationship that fulfills formula (7) below, whereas the respective y values (y0, y2, y3, and y4) are in a magnitude relationship that fulfills formula (8) below.

[Formula 7]

$$x3 < x5 < x2 = x0 \quad (7)$$

[Formula 8]

$$y3 < y4 < y2 = y0 \quad (8)$$

Embodiment 12

Embodiment 12 of the present invention will be described with reference to FIG. 27. In Embodiment 12, the chromaticity distribution of the chromaticity correction region 1130 is further modified from Embodiment 11. Descriptions of structures, operations, and effects similar to those of Embodiment 11, and thus an explanation thereof will not be repeated.

Figure 27:
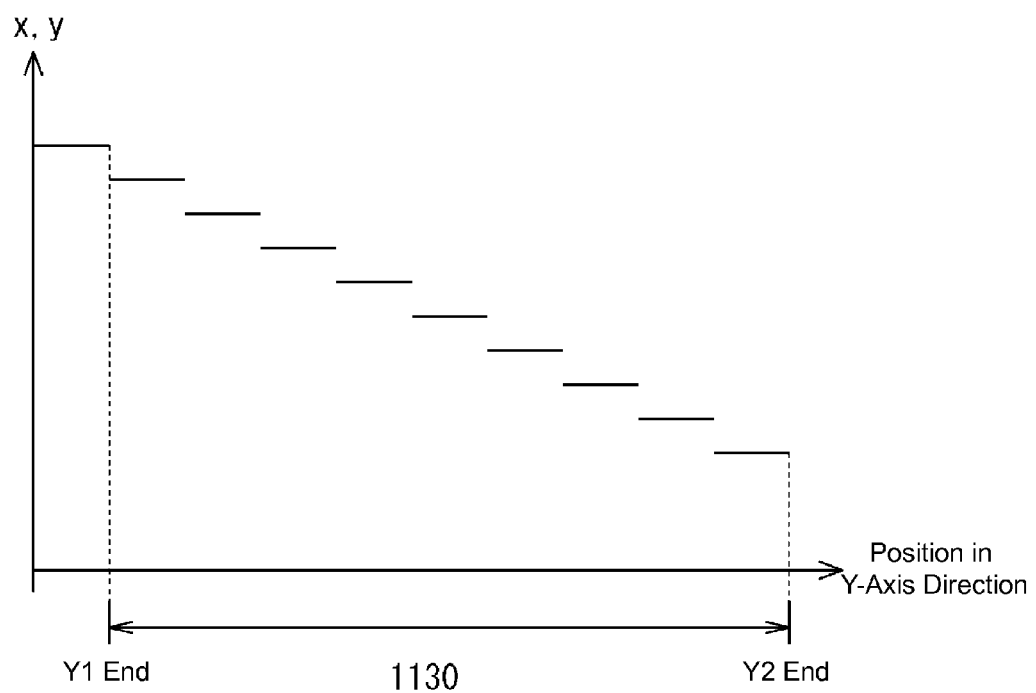
FIG. 27 is a graph showing a change in the chromaticity coordinate values going from a Y1 end to a Y2 end of the diffusion sheet according to Embodiment 12 of the present invention.

As shown in FIG. 27, the chromaticity correction region 1130 of the diffusion sheet of the present embodiment has a chromaticity that stepwisely (in many steps; at least 4 steps) and consecutively decreases further away from the LEDs (Y1 end).

Other Embodiments

The present invention is not limited to the embodiments shown in the drawings and described above, and the following embodiments are also included in the technical scope of the present invention, for example.

(1) In the respective embodiments above, an example was shown in which a diffusion sheet having colorless light diffusing particles and blue-colored light diffusing particles is used, but a diffusion sheet having only blue-colored light diffusing particles and no colorless light diffusing particles can be used instead. Furthermore, a configuration having color-exhibiting light diffusing particles other than the colorless light diffusing particles and the blue-colored light diffusing particles are also included in the present invention.

(2) In the respective embodiments above, an example was shown in which light diffusing particles are fixed to one surface of the transparent base material that constitutes the diffusion sheet, but a configuration may be used in which a large number of light diffusing particles are dispersed within the transparent base material, for example.

(3) In the respective embodiments (except for Embodiments 11 and 12) described above, an example was shown in which the maximum value of the chromaticity coordinates of the chromaticity correction region of the diffusion sheet or the first lens sheet (second lens sheet) or the second chromaticity correction region become equal to the chromaticity coordinates of the white color reference chromaticity or become less than this reference, but a configuration is also possible in which this maximum value becomes greater than the chromaticity coordinates of the white color reference chromaticity. Even in such a case, it is preferable that the minimum value of the chromaticity coordinates in the respective chromaticity correction regions become less than the chromaticity coordinates of the white color reference chromaticity.

(4) In the respective embodiments above (except Embodiments 3 and 9), an example was shown in which the chromaticity correction region is provided on one of either the diffusion sheet or the first lens sheet (second lens sheet), but it is also possible to provide the chromaticity correction region on both the diffusion sheet and the first lens sheet (second lens sheet). In such a case, it is also possible to further provide the second chromaticity correction region on the lens sheet.

(5) In Embodiments 2 and 8, an example was shown in which the chromaticity correction region was provided on one of either the first lens sheet or the second lens sheet, but the chromaticity correction region can be provided on both the first lens sheet and the second lens sheet. In such a case, it is also possible to provide the chromaticity correction region on the diffusion sheet and provide the second chromaticity correction region on the reflective sheet.

(6) Embodiments 1 and 6 may be combined together such that the light diffusing particles on the diffusion sheet include blue-colored light diffusing particles, and a blue-colored film is attached to the transparent base material. In a similar manner, Embodiments 1 and 7 may be combined together such that the light diffusing particles on the diffusion sheet include blue-colored light diffusion particles, and dots made of a coating exhibiting a blue color are provided on the transparent base material. Embodiments 1, 6, and 7 may also be combined together.

(7) On the diffusion sheet described in Embodiments 6 and 7, it is also possible to omit the light diffusing particles and form a large number of bubbles in the transparent base material to diffuse the light therewith.

(8) It is also possible to have an arrangement in which the location of the lens film and blue-colored film described in Embodiment 2 are inverted.

(9) It is also possible to have an arrangement in which the lens film described in Embodiment 8 is provided on the light-exiting surface of the transparent base material.

(10) As a further modification example of Embodiment 11, it is also possible to have a configuration in which the diffusion sheet follows the end opposite to the third region side of the second region from the end on the first region side (LED side) of the third region side, whereby the mixing ratio (distribution density) of the blue-colored diffusing particles becomes greater and the mixing ratio (distribution density) of the colorless light diffusing particles becomes smaller.

(11) In Embodiments 5 and 11, an example was shown in which the diffusion sheet is uniformly demarcated into a plurality of sections, but it is also possible to demarcate the respective regions in a non-uniform manner.

(12) In the respective embodiments described above, an example was shown in which the diffusion sheet and two lens sheets are used as the optical sheets, but it is also possible to use a luminance-enhancing sheet or the like as another kind of optical sheet, for example. In such a case, it is possible to provide the chromaticity correction region on this other sheet, such as the luminance-enhancing sheet. Furthermore, the number of optical sheets used can be modified as appropriate.

(13) In the respective embodiments described above, an example was shown in which one end face of the short side of the light guide plate is a light-receiving face that opposes the LED, but an arrangement in which one end face of the long side of the light guide plate is a light-receiving face that opposes the LED is also included in the present invention.

(14) The design of the chromaticity in the chromaticity correction regions described in the respective embodiments above may correspond to the chromaticity of the light emitted from the LEDs of a backlight device, specifically. Namely, if the chromaticity of the LEDs of the backlight device deviate from a white color reference chromaticity and develop a yellow tinge, for example, it is preferable to have a chromaticity design in which the maximum value of the chromaticity coordinates in the chromaticity correction region as described in (3) become larger than the chromaticity coordinates related to the white color reference chromaticity. Furthermore, if the chromaticity of the LEDs being used develop a blue tinge, then the chromaticity design of the chromaticity correction region as described in Embodiment 10 is desirable.

(15) In the respective embodiments described above, an example was shown in which the white color reference chromaticity is related to the light emitted by the LEDs used in a backlight device, with chromaticity coordinates of (0.272, 0.277), but the white color reference chromaticity may be modified to something different, as appropriate. Specifically, for the white color reference chromaticity it is also possible to use: D65 light source (0.3157, 0.3290), A light source (0.4476, 0.4074), B light source (0.3484, 0.3516), C light source (0.3101, 0.3161), white color reference chromaticity related to CIE color coordinate system (0.3333, 0.3333), white color reference chromaticity related to the NTSC standard (0.3100, 0.3160, white color reference chromaticity related to the Adobe RGB standard (0.3127, 0.3290), or the like, for example.

(16) In addition to the respective embodiments described above, the relative positional relationship of the chromaticity in the chromaticity correction region with respect to the white color reference chromaticity in the CIE 1931 color map can be modified as appropriate. A design is possible in which the largest value or the smallest value in the chromaticity coordinates of the chromaticity in the chromaticity correction region has a cyan tinge or a magenta tinge with respect to the white color reference chromaticity, for example. Furthermore, a design is also possible in which the largest value or the smallest value in the chromaticity coordinates of the chromaticity in the chromaticity correction region has a green tinge or a red tinge with respect to the white color reference chromaticity.

(17) In addition to the respective embodiments described above, it is also possible to add a touch panel (positional information detecting panel) between the cover panel and the liquid crystal panel, and in such a case, it is preferable that the area between the cover panel and the touch panel be sealed with an adhesive agent and that the area between the touch panel and the liquid crystal panel be sealed with an adhesive agent. Moreover, a touch panel pattern can be formed on the cover panel and touch panel functionality (positional information detection functionality) can also be added. For the touch panel pattern of the touch panel, it is possible to use a projection type capacitance scheme, a surface type capacitance scheme, a resistive film scheme, an electromagnetic induction scheme, or the like.

(18) In the respective embodiments described above, an example was shown in which the colored portions of the color filter in the liquid crystal panel are the three colors R, G, and B, but it is possible for the colored portions to include four or more colors.

(19) In addition to the respective embodiments described above, the primary wavelength and type of phosphor used for the LEDs can be modified as appropriate.

(20) In the respective embodiments described above, an example was shown in which the LED being used has an LED chip that emits a single color of blue embedded therein and emits substantially white light due to a phosphor, but a configuration in which the LED has an LED chip that emits a single color of purple (bluish purple) embedded therein and emits substantially white light due to a phosphor is also included in the present invention.

(21) In the respective embodiments above, an LED is used in which an LED chip that only emits blue light is covered by a fluorescent material, thus emitting substantially white light, but the present invention includes a case in which the LED includes three types of LED chips that respectively emit red light, green light, and blue light. The present invention also includes an LED constituted of three types of LED chips that respectively emit only C (cyan), only M (magenta), and only Y (yellow).

(22) In the embodiments above, LEDs are used as the light source, but it is apparent that other types of light sources (cold cathode ray tube, hot cathode ray tube, organic EL, or the like) can be used.

(23) In the respective embodiments described above, an example was shown in which the panel support frame is made of a synthetic resin, but the panel support frame can be made metal instead.

(24) In the respective embodiments above, the cover panel is made of tempered glass that is tempered by being chemically strengthened, but a tempered glass that is strengthened by air cooling (physical strengthening) may naturally be used.

(25) In the respective embodiments above, a tempered glass being used as the cover panel was shown as an example, but an ordinary glass material (non-tempered glass) or a synthetic resin material can also be used.

(26) In the respective embodiments above, the display surface is a horizontally long liquid crystal display device, but a liquid crystal display device in which the display surface is vertically long is also included in the present invention. Also, a liquid crystal display device in which the display surface is square is also included in the present invention.

(27) In the respective embodiments above, TFTs are used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

DESCRIPTION OF REFERENCE CHARACTERS 10 liquid crystal display device (display device)
11, 311 liquid crystal panel (display panel)
11a, 311a CF substrate (substrate)
11b, 311b array substrate (substrate)
13 backlight device (illumination device)
22, 122, 222, 322, 422, 522, 622, 722, 822, 1022 LEDs (light source)
24, 224, 824 light guide plate
24a, 224a light-receiving face
24b, 224b light-exiting surface
24c plate surface
24d end face on opposite side or LED non-facing end face (light source non-facing end face)
24e long side end face or LED non-facing end face (light source non-facing end face)
25, 125, 225, 425 optical sheet (optical member)
25a, 225a, 425a, 525a, 625a, 1025a diffusion sheet (light diffusing member)
30, 130, 230, 430, 730, 1030, 1130 chromaticity correction region
31, 431, 531 631 transparent base material
31a, 531a, 631a light-receiving face
31b light-exiting surface
32, 432, 532, 632, 1032 light diffusing particles
32b, 43b, 1032b blue-colored light diffusing particles
34, 74 transparent base material
34b light-exiting surface (one plate surface)
35a, 735a prisms
36, 536, 836 blue colored film
378 second chromaticity correction region
39 liquid crystal layer
125b, 725b first lens sheet (focusing member)
226, 826 reflective sheet (reflecting member)
734a light-receiving face (one plate surface)
G1, G2 gap

What is claimed is:

1. An illumination device comprising:
a light source;
a light guide plate having a light-receiving side face opposing the light source and receiving light therefrom, and a light-exiting surface from where the received light exits;
an optical member disposed so as to face the light-exiting surface of the light guide plate and exert an optical effect on light emitted therefrom, the optical member having, on at least one area thereof, a chromaticity correction region that is configured to transmit light having chromaticity coordinate values x and y in a CIE 1931 color space that both progressively decrease further away from the light source when receiving a reference white light, the chromaticity correction region thereby compensating for a chromaticity distribution that is generated by the light guide plate processing the light from the light source so as to emit light that has substantially uniform chromaticity across the chromaticity correction region when processing the light originating from the light source; and
a reflecting member in contact with a surface of the light guide plate on a side opposite to the light-exiting surface of the light guide plate, said reflecting member causing light in the light guide plate to be reflected towards the light-exiting surface of the light guide plate,
wherein the reflecting member has, on at least one area thereof, a chromaticity correction region configured to generate reflected light having chromaticity coordinate values x and y in the CIE 1931 color space that both progressively decrease further away from the light source when reflecting the reference white light.

2. The illumination device according to claim 1, wherein the optical member is configured such that a maximum value of x and a maximum value of y in the chromaticity correction region of the optical member are respectively approximately equal to chromaticity coordinate values x0 and y0 of said reference white light.

3. The illumination device according to claim 1, wherein the optical member is configured such that the x and y values of the light transmitted from the chromaticity correction region of the optical member in response to the reference white light both linearly decrease further away from the light source.

4. The illumination device according to claim 1,
wherein the light guide plate has a rectangular shape in a plan view, one short-side end face thereof being the light-receiving side face and another short-side end face on a side opposite to said light-receiving face and a pair of long-side end faces being non-light source facing end faces that do not face the light source, and
wherein the optical member has a rectangular shape in a plan view corresponding to the light guide plate, and at least an end of the optical member on a side opposite to the light source is the chromaticity correction region of the optical member.

5. The illumination device according to claim 1, wherein the chromaticity correction region of the optical member comprises all regions of the optical member.

6. The illumination device according to claim 1,
wherein the optical member comprises a light diffusing member having at least a transparent base material and light diffusing particles provided on the transparent base material that diffuse light, and
wherein the chromaticity correction region of the optical member is formed in at least a portion of the light diffusing member.

7. The illumination device according to claim 6,
wherein the light diffusing particles at least comprise blue-colored light diffusing particles that exhibit a blue color, and
wherein the light diffusing member is configured such that a concentration of light diffusing particles in the chromaticity correction region of the optical member becomes progressively greater further away from the light source.

8. The illumination device according to claim 1,
wherein the optical member comprises a transparent base material, and a light focusing member disposed on one surface of the transparent base material and having at least a plurality of prisms extending in a straight line on said one surface of the transparent base material, and
wherein the chromaticity correction region of the optical member is formed in at least a portion of the light focusing member.

9. The illumination device according to claim 1, wherein the optical member has a blue-colored film having a pigment or dye exhibiting a blue color attached thereto, and a concentration of said pigment or dye in the chromaticity correction region of the optical member is made progressively greater further away from the light source.

10. The illumination device according to claim 1,
wherein the light source is a light-emitting diode device, and
wherein said light-emitting diode device comprises at least a light-emitting diode element that emits an approximately single-color light of a blue color, and a phosphor that emits light when excited by light from said light-emitting diode element.

11. A display device, comprising:
the illumination device according to claim 1; and
a display panel that performs display using light from said illumination device.

12. The display device according to claim 11, wherein the display panel is a liquid crystal panel having liquid crystal sealed between a pair of substrates.

13. The display device according to claim 12, wherein the liquid crystal panel is configured such that a gap defined between the pair of the substrates becomes progressively wider further away from the light source.

* * * * *